(12) United States Patent
Jacot et al.

(10) Patent No.: US 11,854,220 B2
(45) Date of Patent: Dec. 26, 2023

(54) SYSTEM AND METHOD FOR MEASURING THE PROFILE OF A WORKPIECE

(71) Applicant: LDI Finances, Thyez (FR)

(72) Inventors: Philippe Jacot, Bevaix (CH); Sébastien Laporte, Thyez (FR); Frédéric Perret, Annecy-le-Vieux (FR)

(73) Assignee: WATCHOUTCORP SA, Yverdon-les-Bains (CH)

( * ) Notice: Subject to any disclaimer, the term of this patent is extended or adjusted under 35 U.S.C. 154(b) by 391 days.

(21) Appl. No.: 17/299,456

(22) PCT Filed: Nov. 28, 2019

(86) PCT No.: PCT/IB2019/060289
§ 371 (c)(1),
(2) Date: Jun. 3, 2021

(87) PCT Pub. No.: WO2020/115621
PCT Pub. Date: Jun. 11, 2020

(65) Prior Publication Data
US 2022/0028106 A1    Jan. 27, 2022

(30) Foreign Application Priority Data

Dec. 4, 2018 (CH) .................................. 01490/18

(51) Int. Cl.
*G06T 7/64* (2017.01)
*G01B 11/24* (2006.01)
(Continued)

(52) U.S. Cl.
CPC ................ *G06T 7/70* (2017.01); *G01B 11/24* (2013.01); *G06T 7/001* (2013.01); *G06T 7/20* (2013.01);
(Continued)

(58) Field of Classification Search
CPC . G06T 2207/30164; G06T 7/64; G01B 5/012; G01B 7/012; G01B 11/24
See application file for complete search history.

(56) References Cited

U.S. PATENT DOCUMENTS

| 4,574,199 A | 3/1986 | Pryor |
| 5,615,489 A | 4/1997 | Breyer et al. |

(Continued)

FOREIGN PATENT DOCUMENTS

| CN | 103797328 A | 5/2014 |
| CN | 105841576 A | 8/2016 |

(Continued)

OTHER PUBLICATIONS

Translation of Preliminary Rejection for corresponding Korean application No. 10-2021-7020728 dated Dec. 1, 2022.

(Continued)

*Primary Examiner* — Jayanti K Patel
*Assistant Examiner* — Christopher Kingsbury Glover
(74) *Attorney, Agent, or Firm* — Pearne & Gordon LLP

(57) ABSTRACT

A system and a method for measuring the profile of a part. The measurement system includes a sensor with a probe having at least one degree of freedom, and a first reference element fastened to the probe. The sensor is arranged so that the probe is able to follow the internal or external contour of the part while the first reference element is outside the part. An imaging device is adapted to capture an image representing at least a portion of the outside of the part and the first reference element. Thus, the first reference element serves as a reference element for the position of the probe relative to the reference system that is the part.

23 Claims, 14 Drawing Sheets

(51) Int. Cl.
    *G06T 7/00*           (2017.01)
    *G06T 7/20*           (2017.01)
    *G06T 7/70*           (2017.01)
    *H04N 23/56*         (2023.01)

(52) U.S. Cl.
    CPC ............... *G06T 7/64* (2017.01); *H04N 23/56* (2023.01); *G06T 2207/10016* (2013.01); *G06T 2207/30164* (2013.01)

(56) References Cited

U.S. PATENT DOCUMENTS

| | | | |
|---|---|---|---|
| 5,825,666 | A | 10/1998 | Freifeld |
| 10,935,366 | B2 * | 3/2021 | Christoph ............ G01B 11/007 |
| 2005/0000102 | A1 | 1/2005 | Christoph et al. |
| 2005/0259271 | A1 | 11/2005 | Christoph |
| 2008/0239327 | A1 | 10/2008 | Bryll |
| 2009/0144999 | A1 | 6/2009 | Lau |
| 2011/0167657 | A1 * | 7/2011 | Eaton ..................... G01B 21/04 33/503 |
| 2012/0246953 | A1 * | 10/2012 | Engel .................. G01B 21/045 33/502 |
| 2016/0370172 | A1 * | 12/2016 | Christoph .............. G01B 5/012 |
| 2017/0090742 | A1 * | 3/2017 | Ade ..................... G01B 21/047 |
| 2018/0018778 | A1 | 1/2018 | Haverkamp et al. |
| 2018/0094913 | A1 | 4/2018 | Held |
| 2018/0094914 | A1 | 4/2018 | Held et al. |

FOREIGN PATENT DOCUMENTS

| | | |
|---|---|---|
| DE | 2605772 A1 | 8/1977 |
| DE | 19824107 A1 | 12/1999 |
| DE | 10258579 A1 | 7/2004 |
| DE | 102015205569 A1 | 9/2016 |
| JP | H03046808 U | 4/1991 |
| JP | 2008256692 A | 10/2008 |
| WO | 9314375 A1 | 7/1993 |

OTHER PUBLICATIONS

International Search Report for PCT/IB2019/060289 dated Feb. 26, 2020.

Translation of Office Action for corresponding Japanese application No. 2021-529129 dated May 18, 2022.

* cited by examiner

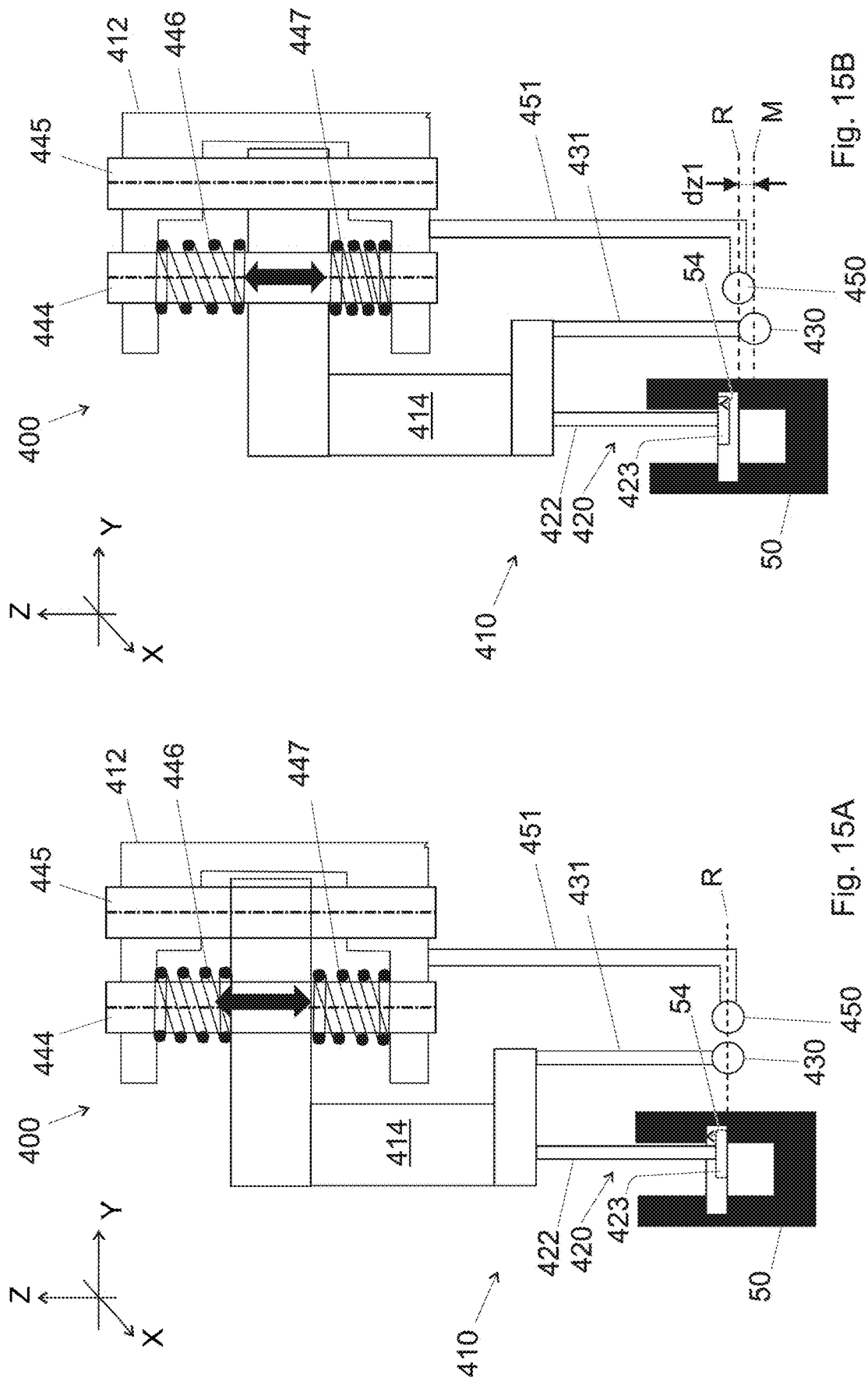

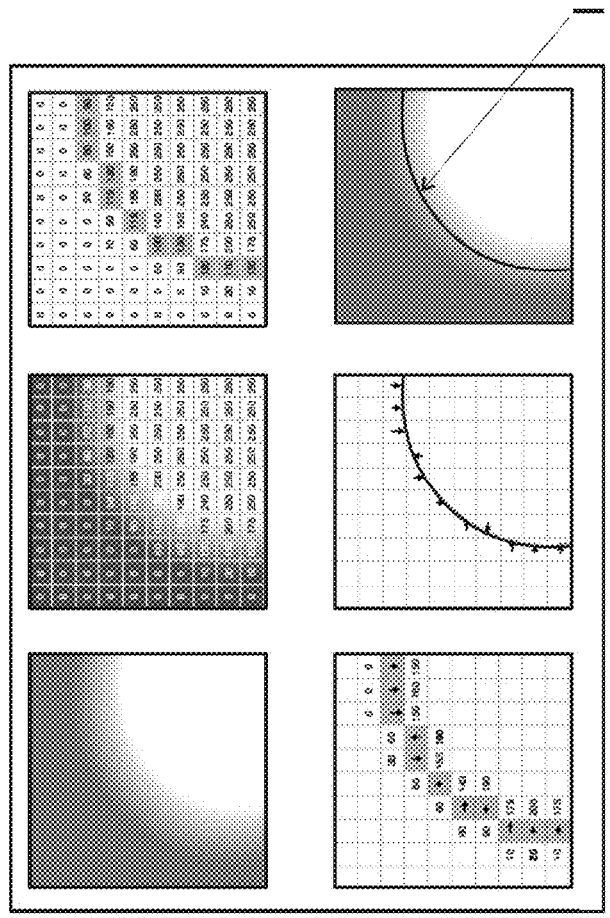
Fig. 17A  Fig. 17B  Fig. 17C
Fig. 17D  Fig. 17E  Fig. 17F
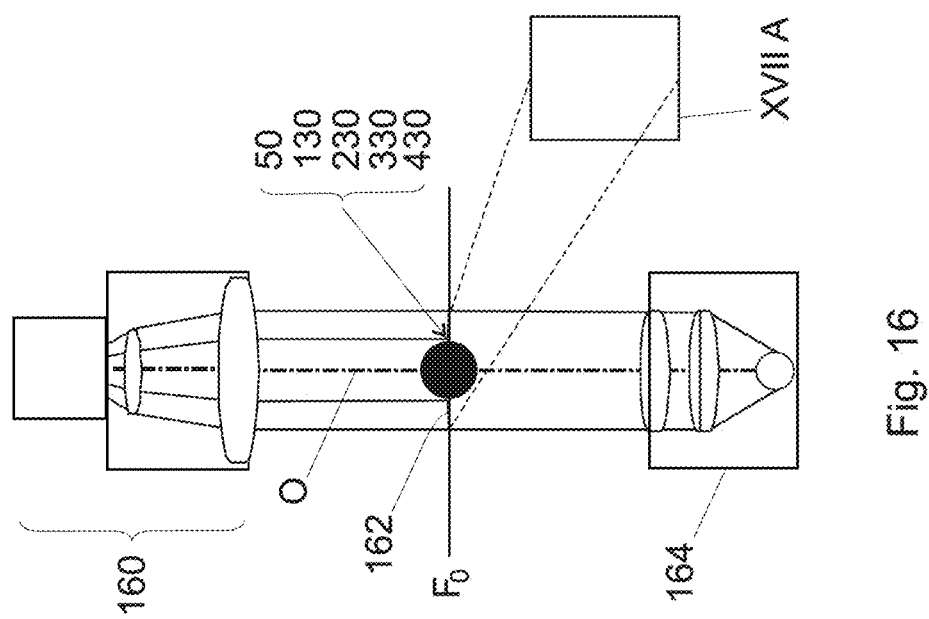
Fig. 16

SYSTEM AND METHOD FOR MEASURING THE PROFILE OF A WORKPIECE

TECHNICAL FIELD

The present invention concerns the field of measuring the dimensions of an object or of a part. In particular, the present invention concerns the field of determining the dimensions of an object or of a part using a sensor (touch-sensitive or not).

This type of measurement is used in numerous fields applying dimensional metrology, which include in particular, although not exclusively, the field of machining parts, in particular using a machine tool or any other form of machining by removing material, but also for manufacture by addition of material. Such measurement is in particular also useful in the case of monitoring wear or during maintenance operations.

In the field of machine tools there exists a need to know accurately the dimensions and/or the profile of a part in order to provide a plan of procedure conforming to the machining drawing developed during development.

PRIOR ART

Various systems aiming to measure the coordinates of an object in an optical-touch-sensitive manner have been proposed, in particular systems comprising a flexible probe.

The document US2005259271A utilizes a scanner in the form of a feeler head mounted on a flexible probe extension. A first optical system forming a unit in one piece with the scanner detects the position of the feeler head in a plane x, y while an autonomous second optical system detects the position of the feeler head in the direction z.

The documents US2016370172A and US2005000102A describe coordinate measurement systems comprising a feeler head the position of which is tracked by an optical sensor mounted coaxially with the probe. In the document US2016370172A, the probe is provided with a flexible extension with a contact element coming into contact with the part and carrying a reference mark situated in vertical alignment with the touch-sensitive part of the probe. In the document US2005000102A the coordinate measuring instrument includes a feeler head mounted on an extension and the position of which is identified by an optical system the optical axis of which is aligned with the feeler head.

In these solutions it is not possible or not always possible to measure the movement of the feeler head in the three directions in space, in particular if the feeler head is hidden, in particular in a recess or a bore in the part.

The document US2009144999A describes a probe for measuring the interior contour of a hollow part. That probe includes a bar the lower end of which carries a feeler head that comes into contact with the surface to be measured and the upper end of which emerges from the part and carries a target the position of which is identified by an optical sensor, in particular a laser sensor. The bar is rendered mobile by mounting it on a spherical articulation also offering a degree of freedom in translation. This arrangement requires a support for the spherical articulation that is mounted on the part to be measured, which generates an additional manipulation. Moreover, calibrating the probe requires precise and reproducible mounting of the probe/support on the part to be measured.

The prior art solutions rely on taking measurements relative to markers external to the part and to the measurement system, i.e. involve intermediate measurements relative to precise axes in the measuring procedure. This adds steps into taking the measurements and leads to cumulative uncertainties, or even measuring errors, whence the provision of a final result concerning the measurement that is not as accurate as required.

These solutions therefore do not make it possible to make available a device that is fast to set up and to use and above all that enables easy measurement of the profile, in particular the internal profile, of an object or of a part, and in particular of a hollow part.

Moreover, the above solutions are not always of sufficient accuracy for some applications.

BRIEF SUMMARY OF THE INVENTION

An object of the present invention is to propose a measurement technology that is free of the limitations of known measuring techniques enabling measurement of the profile, and in particular the internal profile, of an object or a part.

Another object of the invention is to propose a technology enabling measurement of the profile, and in particular the internal profile, of an object or a part that provides a very accurate measurement of the portions of a part.

Another object of the invention is to propose a technology enabling measurement of the profile, and in particular of the internal profile, of an object or of a part with a minimum of measuring steps.

According to the invention, the above objects are in particular achieved by means of a system for measuring an external profile of a part or an internal profile of a hollow part, comprising:
- a part, the internal or external profile of which is to be measured,
- a sensor including a probe, and a first reference element fastened to the probe, a base and a guide system connecting the probe with the base, allowing relative movement between them at least in accordance with one degree of freedom defining a measurement direction,
- said sensor being arranged so that during the movement of the sensor relative to the part in a different direction to the direction of measurement, said probe is able to follow the internal or external contour of the part whereas the first reference element is outside the part and effects a path reproducing the path of the probe along the internal or external contour of the part, and
- an imaging device adapted to capture images representing at least a portion of the outside of the part and the first reference element, whereby, by comparison between the images taken by the imaging device, the relative movement between the first reference element and the portion of the outside of the part in said measurement direction is detected, and a relative movement between the probe and the base is deduced therefrom, which corresponds to an offset in the measurement direction along the measured profile of the part.

This solution has in particular the advantage over the prior art of not necessitating direct identification of the position of the probe or of a feeler head that would be in contact with the profile of the part because it is the first reference element, remaining in all cases outside the part during the measurement, that is adapted to reproduce the movement of the probe and that serves as a reference element for determining the position of the point of contact between the face of the part and the probe. Thus, the first reference element serves as a reference element for the position of the probe relative to the reference system that is the part itself.

This occurs firstly in the case of determining the external profile of a part or determining the internal profile of a hollow part, whether the hollow part has or does not have an opening (open hole or blind hole). Also, secondly in the case of determining the internal profile of a part, thanks to the spatial offset between the probe and the first reference element, the probe may be left inside the part, in a hollow portion, whilst the first reference element remains outside the part, which makes it possible to maintain access (for example optically or by contact) to the first reference element and thus greatly to facilitate the determination of the position of the probe via the determination of the position of the first reference element relative to the part.

The probe therefore has at least one degree of freedom relative to the part when the measurement system is immobile in the position to measure the profile of a part and during movement of the part relative to the measurement system. This possibility of movement of the probe (or mobile part of the sensor) relative to the rest of the measurement system enables it to follow the contour (internal profile or external profile) of the part to be inspected. It is clear that the imaging device has an optical field (or field of view) that makes it possible to see and therefore to capture an image including both a portion of the outside of the part and the first reference element. In this way, capturing successive images while the part moves relative to the measurement system makes it possible for the imaging device to see through the movement of the first reference element in the field of view what profile corresponds to this travel of the first reference element.

According to a disposition, the internal contour or the external contour or both the internal contour and the external contour of the part forms a face of revolution around an axis. This axis is, for example, an axis parallel to the main axis of the sensor.

According to one arrangement, the sensor further comprises a base and a guide system connecting the probe with the base. This produces controlled movement of the probe relative to the rest of the measurement system when the latter is in a measuring position relative to a part.

According to one possible arrangement, said guide system allows only one degree of freedom between the probe and the base. Thus a measurement system is available that is simple in its design and makes it possible for the probe to follow the variation of the contour of the part in a direction allowed by the degree of freedom, which is necessary and sufficient in a great many cases.

According to another arrangement, said measurement system further comprises a second reference element fastened to the base and disposed outside the part, said second reference element being placed so that the imaging device is able to see simultaneously said first reference element, said second reference element and said portion of the outside of the part. In fact, the second reference element remains in all cases outside the part, the internal or external profile of which is measured. This arrangement enables use with the second reference element of an immobile element of the measurement system serving as another fixed marker relative to which the movements of the first reference element may be viewed (via the imaging device), and consequently the movements of the probe, in particular in at least one direction allowed by the guide system.

According to a first possible embodiment of the invention, the probe includes a feeler head able to follow and to detect the internal or external contour of the part by contact. A feeler head of this kind physically follows the contour of the part to be measured and in particular the internal, and therefore hidden, contour when measuring the internal contour.

In accordance with a second possible embodiment of the invention, the probe includes a detection head adapted to follow and to detect the internal or external contour of the part without contact. For example, and in a non-limiting manner, this is a probe functioning optically (optical detection head), or for example a proximity sensor (distance or proximity detection head) or again an electromagnetic or acoustic sensor (electromagnetic or acoustic detection head).

According to one arrangement, the imaging device includes a video camera and a light source adapted to illuminate simultaneously said portion of the outside of the part and the first reference element. This arrangement enables the video camera to provide a sufficiently contrasted image, in particular if the probe is disposed in a hollow part and the first reference element is disposed outside the part.

According to one arrangement, the video camera has a field of view enabling it to see said portion of the outside of the part and the first reference element. This arrangement makes it possible to enable the video camera to produce an image of the portion of the outside of the part or of the first reference element, in particular when the probe is disposed in a hollow part and the first reference element is disposed outside the part.

According to one arrangement, the guide system includes return means enabling return of the mobile part of the sensor, and therefore of the probe, into a rest position relative to the base when the probe is no longer interacting with the internal or external contour of the part. During the interaction between the probe and the contour of the part, namely in particular feeling or bringing into contact together with bearing when the probe is a feeler head, effective interaction is guaranteed (in particular effective contact), guaranteeing a position of the probe, and therefore of the first reference element, corresponding to the contour of the part. In the case of a contactless interaction, effective detection between the probe and the first reference element to enable the measurement is guaranteed. Moreover, when the measurement has been effected these return means enable the mobile part of the sensor and therefore the probe to return into a rest position in which there is no stress (mechanical or otherwise) in the measurement system, in particular in the transmission subsystem (in particular the cinematic subsystem) between the first reference element and the probe. These return means may take a number of forms, including and non-limitingly, at least one or more of the following elements: deformable and elastic element, leaf spring (plane, curvilinear, spiral or otherwise), coil spring, etc. These return means may also derive from the structure of the guide system, which causes a natural return to this position of rest simply due to gravity.

According to one arrangement, the guide system includes between the probe (mobile part of the sensor) and the base a sliding connection or a pivoting connection such as a pivot with mechanical elements, magnetic elements, hydraulic elements, etc.

The invention also concerns a method for measuring the profile of a part, in particular using the system for measuring or determining the profile of a part as described in the present text. In particular, the invention concerns a method of measuring the internal profile of a part using a measurement system as described in the present text. In accordance with one possibility the method of measuring a profile of a hollow part comprises the following steps:

i) providing a sensor including a probe and a first reference element fastened to the probe, a base and a guide system connecting the probe with the base, allowing relative movement between them at least in accordance with one degree of freedom defining a measurement direction, and an imaging device, ii) providing a hollow part the profile of which is to be determined, iii) placing the sensor so that the probe detects a point on the contour of the part while the first reference element is outside the part and in the field of view of the imaging device, iv) triggering the imaging system and forming an image representing at least a portion of the outside of the part and said reference element, v) moving the sensor relative to the part in a movement in a different direction to the direction of measurement and enabling the probe to remain inside the part and to follow the contour of the part while the first reference element remains outside the part and effects the same movement as the probe, vi) effecting steps iv) and v) for other points on the contour of the part.

The invention also concerns a method for measuring the external profile of a part, in particular using a measurement system as described in the present text. In accordance with one possibility the method of measuring an external profile of a part comprises the following steps:

i) providing a sensor including a probe, a first reference element fastened to the probe, a base and a guide system connecting the probe with the base, allowing relative movement between them at least in accordance with one degree of freedom defining a measurement direction, and providing an imaging device, ii) providing a hollow part the external profile of which is to be determined, iii) placing the sensor so that the probe is outside the part and detects a point on the external profile of the part whereas the first reference element is also outside the part and in the field of view of the imaging device, iv) triggering the imaging system and forming an image representing at least a portion of the outside of the part and said reference element, v) moving the sensor relative to the part in a movement in a different direction to the direction of measurement and enabling the probe to follow the external contour of the part while the first reference element remains outside the part and effects the same movement as the probe, vi) effecting steps iv) and v) for other points on the external contour of the part.

Generally speaking, the invention also concerns a method of measuring the profile, in particular the internal or external profile, of a part. In accordance with one possibility a method of this kind for measuring a profile of a part comprises the following steps:

i) providing a sensor including a probe, a first reference element fastened to the probe, a base and a guide system connecting the probe with the base, allowing relative movement between them at least in accordance with one degree of freedom defining a measurement direction, and providing an imaging device, ii) providing a hollow part the profile of which is to be determined, iii) placing the sensor so that the probe detects a point on the contour of the part while the first reference element is outside the part and in the field of view of the imaging device, iv) triggering the imaging system and forming an image representing at least a portion of the outside of the part and said reference element, v) moving the sensor relative to the part in a movement in a different direction to the direction of measurement and enabling the probe to follow the contour of the part while the first reference element remains outside the part and effects the same movement as the probe, vi) effecting steps iv) and v) for other points on the contour of the part.

According to one arrangement of one or the other of the above measurement methods, the following steps are further effected:

a) for each image formed by said imaging device, calculating the relative position between the first reference element and the portion of the outside of the part, and b) reconstituting the measured (internal or external) profile of the part on the basis of said relative positions of the first reference element successively calculated.

BRIEF DESCRIPTION OF THE FIGURES

Embodiments of the invention are indicated in the description illustrated by the appended figures in which:

FIGS. 15A and 15B show the steps of measurement using a measurement system according to a fourth embodiment of the present invention, FIGS. 16 and 17A to 17F respectively show the imaging device that may be used in the measurement system according to the invention and the possible steps of processing or analysing the image captured by the imaging device when using the measurement method according to the present invention.

EXAMPLE(S) OF EMBODIMENT(S) OF THE INVENTION

Figure 1:
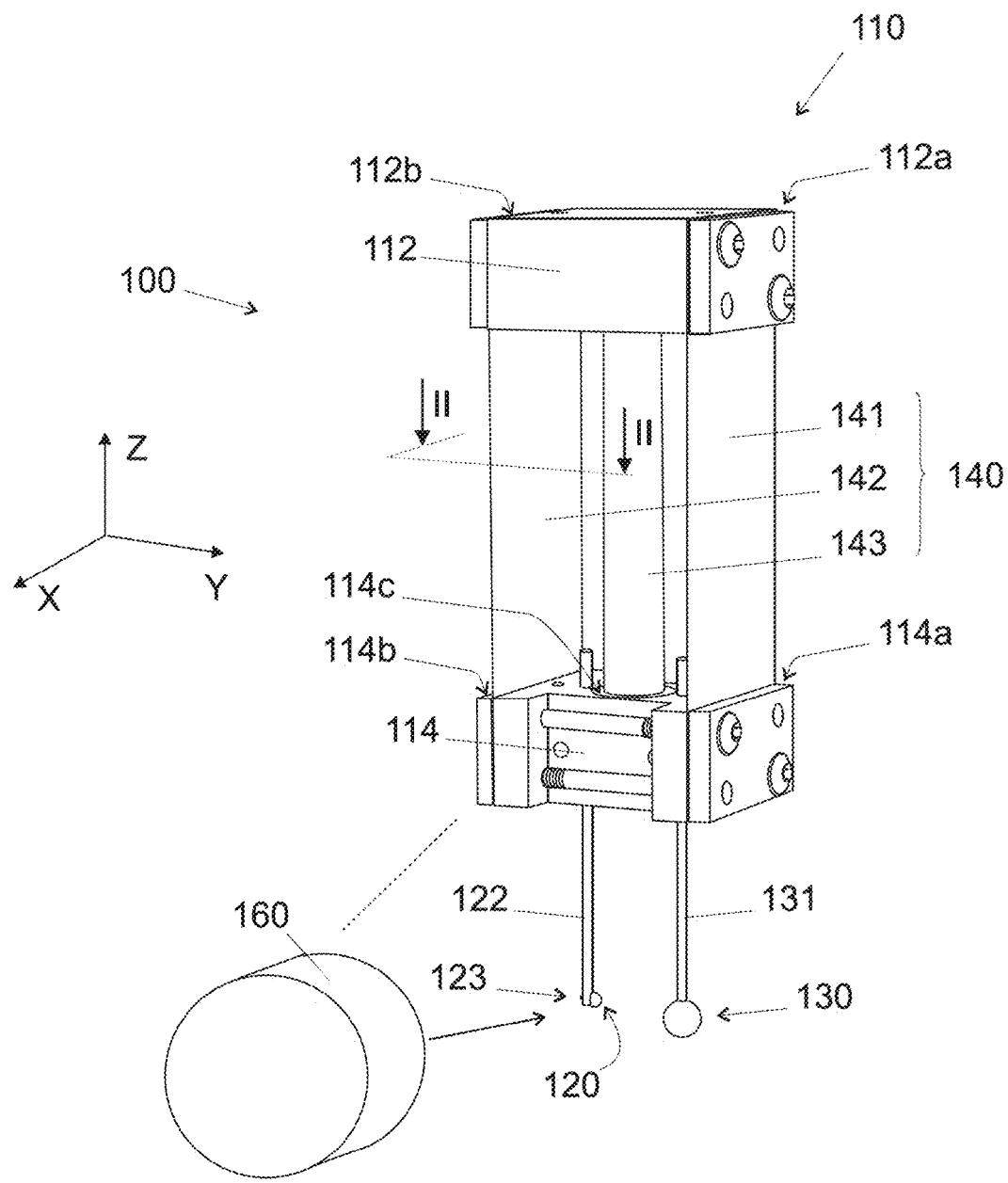
FIG. 1 is a perspective view of the measurement system in accordance with a first embodiment of the present invention.

Referring to FIG. 1, a measurement system 100 comprising a sensor 110 according to the present invention is represented in its rest position, with no contact with a part to be measured. The sensor 110 includes a base 112, here in the form of a rectangular parallelepiped prism that is rigid and virtually undeformable. The greatest dimension of this base 112 defines the axis Y or measurement axis. Seen on this base 112, along this axis Y, are a first end 112a (on the right in FIGS. 1 to 7) and a second end 112b (on the left in FIGS. 1 to 7).

Vertically in line with the base 112 the sensor 110 includes a support portion 114 having a shape and dimensions close to those of the base 112. The support portion 114 is also rigid and virtually undeformable. Seen on this support portion 114, along this axis Y, are a first end 114a (on the right in FIGS. 1 to 7) and a second end 114b (on the left in FIGS. 1 to 7).

A deformable and elastic guide system 140 connects the base 112 and the support portion 114 of the sensor 110 along an axis Z or main axis of the sensor 110, this axis Z being vertical in the figures and when taking measurements. The base 112 and the support portion 114 are aligned with one another along the axis Z in the rest position of the sensor 110.

In line with the main axis Z of the sensor 110 the support portion 114 is extended from its side facing away from the base 112 by a feeler rod 122 and by a rod 131 of a first reference element, also parts of the sensor 110. This feeler rod 122 and this rod 131 of a first reference element are mounted by one of their free ends on the support portion 114. In the rest position the feeler rod 122 and the rod 131 of a first reference element are parallel to one another and to the main axis Z. The feeler rod 122 and the rod 131 of a first reference element are at a distance (and equidistant) from one another along the measurement axis Y by a distance Y0 (see FIG. 6). The feeler rod 122 and the rod 131 of a first reference element therefore define a plane (Y, Z).

In the rest position of the sensor 110 the direction orthogonal to the feeler rod 122 and the rod 131 of the first reference element and that passes through these two rods 122 and 131 is the measurement axis Y. A transverse axis X is defined that is orthogonal to the plane (Z, Y) and orthogonal to the feeler rod 122 and to the rod 131 of the first reference element. The axes X, Y and Z define an orthogonal, preferably orthonormal system of axes. These rods 122 and 131 are for example metal, in particular steel, rods.

The free end (the lower end in FIGS. 1 and 2 to 8) of the feeler rod 122 terminates in a feeler head 123 forming a probe head 120 for the sensor 110 of the measurement system 100. This feeler head 123 is for example made of metal, and in particular of the same metal or metal alloy as the feeler rod 122. The feeler head 123 is for example (see FIG. 6) formed as a sphere with the axis of the feeler rod 21 passing through the centre of the sphere. In an alternative embodiment that can be seen in FIGS. 1, 3 to 5 and 7 the feeler head 123 is in the form of a sphere portion, in this instance a hemisphere, mounted on the side of the free end of the feeler rod 122 that faces toward the rod 131 of the first reference element: in other words, the axis of the hemisphere (feeler head 123) is oriented along the axis Y. In all cases the feeler head 123 includes a portion that projects from the feeler rod 122 in the direction Y and toward the rod 131 of the first reference element. That is to say there exists a portion of the feeler head 123 that extends beyond the feeler rod 122 along the axis Y, this projecting portion of the feeler head 123 facing toward the reference rod 24 (reference head 25). In this way, as will emerge hereinafter, the feeler head 123 may be brought into contact with a surface of a part without the feeler rod 122 also being in contact with the surface of the part.

The free end (the lower end in FIGS. 1 and 3 to 8) of the rod 131 of the first reference element terminates in a first reference element 130. This first reference element 130 is for example made of metal, and in particular of the same metal or metal alloy as the rod 131 of the first reference element. The first reference element 130 is for example (see FIGS. 1 to 7) in the form of a sphere with the axis of the rod 131 of the first reference element passing through the centre of the sphere.

In the embodiment represented in FIGS. 1 to 8 the feeler head 123 is therefore mounted at the free end of the feeler rod 122 and the first reference element 130 is mounted at the free end of the rod 131 of the first reference element. Also, in the embodiment represented in FIGS. 1 to 8, the feeler rod 122 and the rod 131 of the first reference element are the same length, or to be more precise extend beyond the support portion 114 by the same distance along the axis Z. The feeler head 123 and the first reference element 130 are therefore at the same distance Z0 (see FIG. 6) from the support portion 114. In other words the feeler head 123 and the first reference element 130 are below and at the same distance from the support portion 114.

To enable the movement along the axis Y of the feeler head 123 to be imparted to the first reference element 130 the guide system 140 that connects the support portion 114 to the base 112 is deformable and elastic at least along the axis Y. Various embodiments are possible including one or more elastic elements mounted between the support portion 114 and the base 112. In the case of the embodiments shown in FIGS. 1 to 8 two leaf springs 141, 142 are used as the guide system 140. These two leaf springs 141 and 142 are identical and in the rest position of the sensor 110 parallel to each other, to the main axis Z and to the transverse axis X. In other words, the plane of the leaf springs 141, 142 at rest is parallel to the plane X, Z and the plane of the leaf springs 141, 142 at rest is orthogonal to the axis Y. As can be seen in FIG. 1 a first leaf spring 141 is mounted between the first end 112a of the base 112 and the first end 114a of the support portion 114. The second leaf spring 142 is mounted between the second end 112b of the base 112 and the second end 114b of the support portion 114. Alternatively, four leaf springs could be used parallel to one another and to the axes Z and X, mounted two by two, one pair of leaf springs mounted between the first end 112a of the base 112 and the first end 114a of the support portion 114 and another pair of leaf springs mounted between the second end 112b of the base 112 and the second end 114b of the support portion 114.

Figure 5:
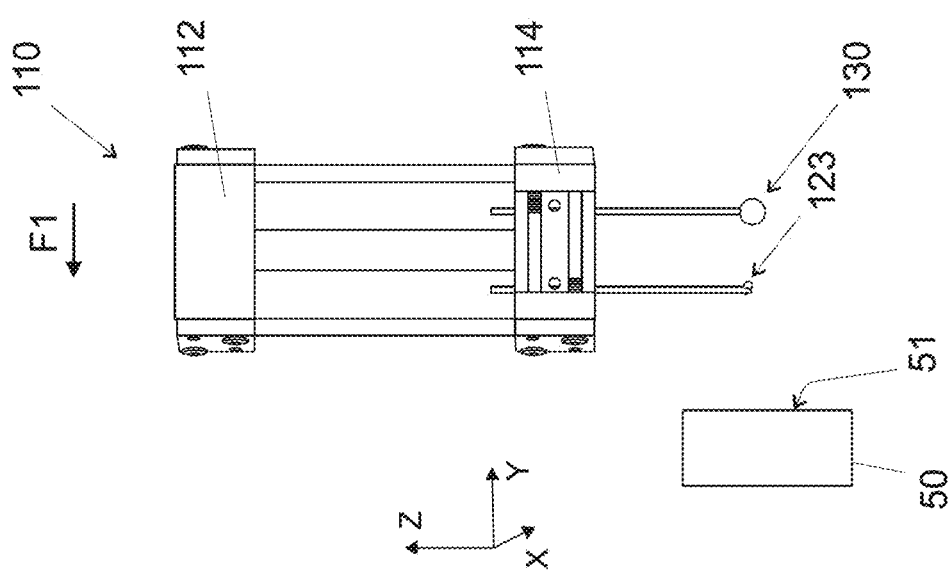

With this arrangement, in the rest position of the sensor 110 (position of rest of the measurement system 100), a frame is formed with the base 112, the support portion 114 and the two leaf springs 141 and 142. This frame forms a rectangle in the plane (Y, Z) in the rest position of the sensor 110 with the length of the rectangle parallel to the axis Z and the width of the rectangle parallel to the axis Y. With this arrangement, in the measurement position of the sensor 110 this rectangle can be deformed as can be seen in FIG. 5. In this situation the base 112 and the support portion 114 remain parallel to one another and to the axis Y with an offset dY1 along the axis Y of the support portion 114 and the rods (heads) of the first reference element 131 and the second reference element 151 and the leaf springs 141 and 142 are deformed. In this measurement position the deformed profile of the leaf springs 141 and 142 includes in the plane (X, Z) two substantially rectilinear end parts and a central part forming a curve with a point of inflection.

Thus, the mobile portion of the sensor 110 forms a probe 120 including the support portion 114 and the elements attached thereto: the feeler rod 122, the feeler head 123, the first reference element (rod 130 and head 131) and the guide system 140 (leaf springs 141 and 142). When passing from the measurement position to the rest position, that is to say that the feeler head 123 is no longer in contact with the face of the part, the leaf springs 141 and 142 resume their initial rectilinear form and the support portion 114 returns to the vertical of the base 112.

According to the embodiment represented in FIGS. 1 to 5 and 8 the guide system 140 further includes a bar 143 the first end 143a of which (the upper end in the figures) is firmly fixed to the base 112 and the second end 143b of which (the lower end in the figures) is mounted on the support portion 114 by a sliding connection at least in the direction Y. In this embodiment the connection between the second end 143b of the bar 140c and the support portion 114 is also a sliding connection in the direction Z, which makes it possible to absorb deformation in the direction Z of the leaf springs 141, 142 or more generally of the guide system 140.

Figure 2:
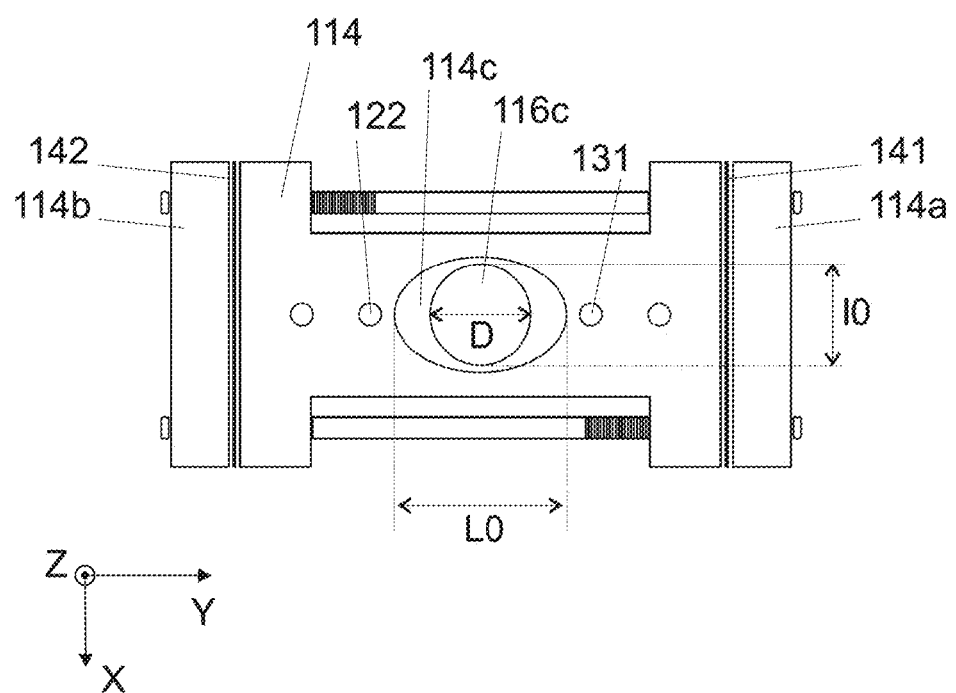
FIG. 2 is a partial sectional view in the direction of the arrow II in FIG. 1 of the measurement system in accordance with the first embodiment of the present invention.

In practice, in the arrangement represented in FIGS. 1 to 5 and 8 the support portion 114 includes a groove 114c facing the base 112 opening onto the upper face of the support portion 114. As can be seen in FIG. 2 the groove 114c has a width l0 along the axis X sufficient to house without play the free end or second end 143a of the bar 143. As can be seen in FIG. 2 the groove 114c has a length L0 along the axis Y to house and to allow movement of the free end or second end 143b of the bar 143 toward the first end 114a or the second end 114b of the support portion 114 over a predetermined maximum distance corresponding to the permitted maximum offset dY1 ($dY1_{max}$). If the bar 143 has a cylindrical shape with a circular section of diameter D the groove 114c therefore has a width l0 equal to or substantially greater than D (l0 is between D and 1.05D inclusive) and a length L0 equal to $D+2(dY1_{max})$. This groove 114c is therefore of elongate general shape along the axis Y. By way of example, this groove 114c may be rectangular, oval or oblong (buttonhole shape). This groove 114c opens or does not open (blind groove) onto the lower face of the support portion 114. By way of example, the maximum offset dY1 ($dY1_{max}$) is a few millimetres, for example 2, 5, 7 or 10 millimetres, to the right and to the left in FIGS. 2 to 5.

Figure 3:
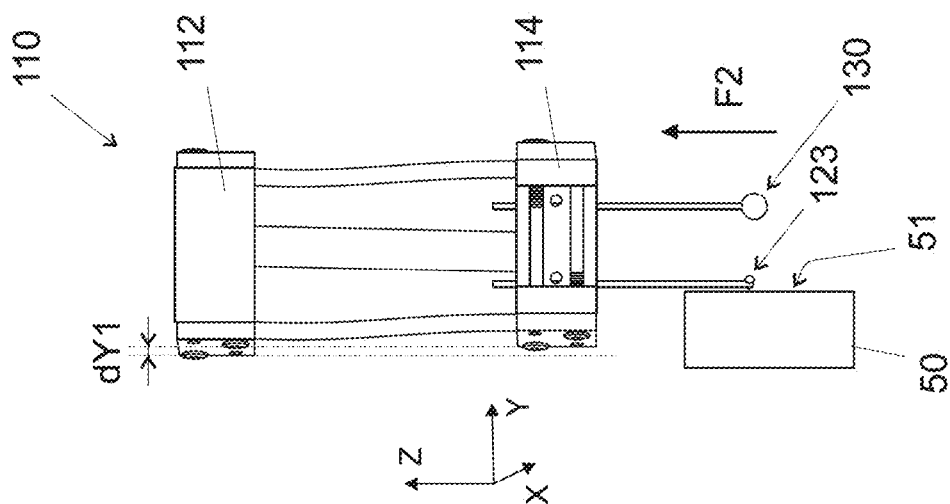
FIGS. 3 to 5 are front views of the various steps of measurement using the measurement system from FIG. 1.
Figure 4:
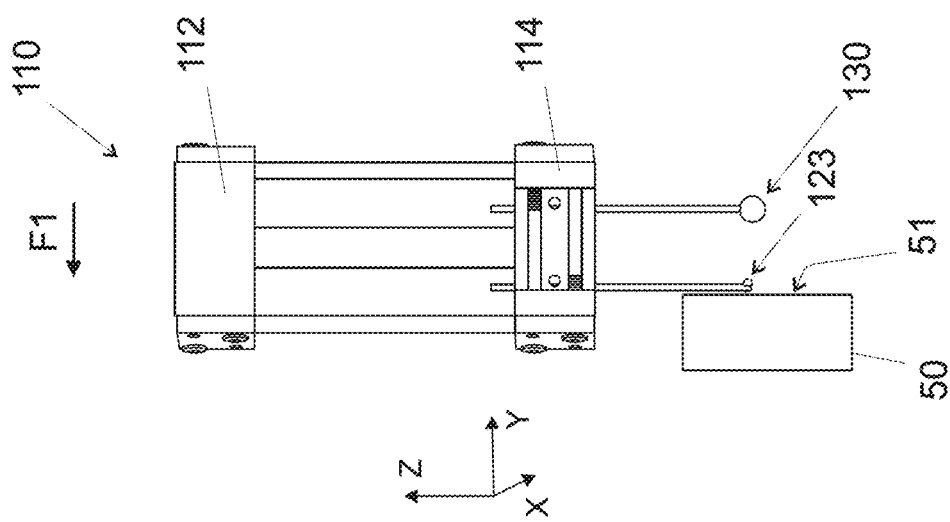

Refer to FIGS. 3 to 5, showing the sensor 110 in the case of measuring the external profile of a part 50, thus a face 51 of the part forming an external face 51. Preferably, this part 50 is a part of revolution around the axis Z, for the face to be measured, that is to say for the external face 51 (and optionally also for the internal face 54).

More generally, a method of the above kind for measuring the external profile of a part includes the following steps:
a) a sensor 110 is procured as described in the present text,
b) a part 50 is procured the external profile of which is to be determined, namely the profile of the face 51 (external face) to be measured,
c) an imaging device 160 (external sensor as in FIG. 7) is procured adapted to determine the position of the first reference element 130 (here, as can be seen in FIG. 3, the sensor 110 is in a rest position with the support portion 114 and the base 112 in an initial position aligned one above the other along the axis Z),
d) the feeler head 123 is placed against the external face 51 while the first reference element 130 remains at a distance from (that is to say outside) said part 50 (movement along the arrow F1 in FIG. 3, by movement between the sensor 110 and the external face 51 of the part 50 toward each other along the axis Y, to finish up in the intermediate position from FIG. 4 in which the guide system 140 is not deformed),
e) the sensor 110 is moved so that the feeler head 123 remains in contact with the external face 51 of the part, with the base 112 moved relative to the support portion 114 and relative to the part 50 along the axis Y (relative movement between the probe 120 and the base 112), (movement in the direction of the arrow F1 in FIG. 4, with the base 112 of the sensor 110 moving relative to the part 50 along the axis Y a distance dY1 to finish up in the measurement position of the sensor 110), and
f) the position of the first reference element 130 is identified by said imaging device 160 which makes it possible to determine the position of the feeler head 123 on the face 51 of the part 50, and
g) the sensor 110 is moved so that the feeler head 123 of the probe 120 goes to another location on the external face 51 of the part 50 while the contact between the feeler head 123 and the external face 51 of the part 50 is maintained (in FIG. 5 vertical movement in the direction of the arrow F2 along the axis Z, although this may be a movement in the direction X and/or the direction Y depending on the geometry of the part 50), after which steps f) and g) are repeated until completion of the determination of the external profile (or of the portion of the external profile) of the part 50.

Figure 6:
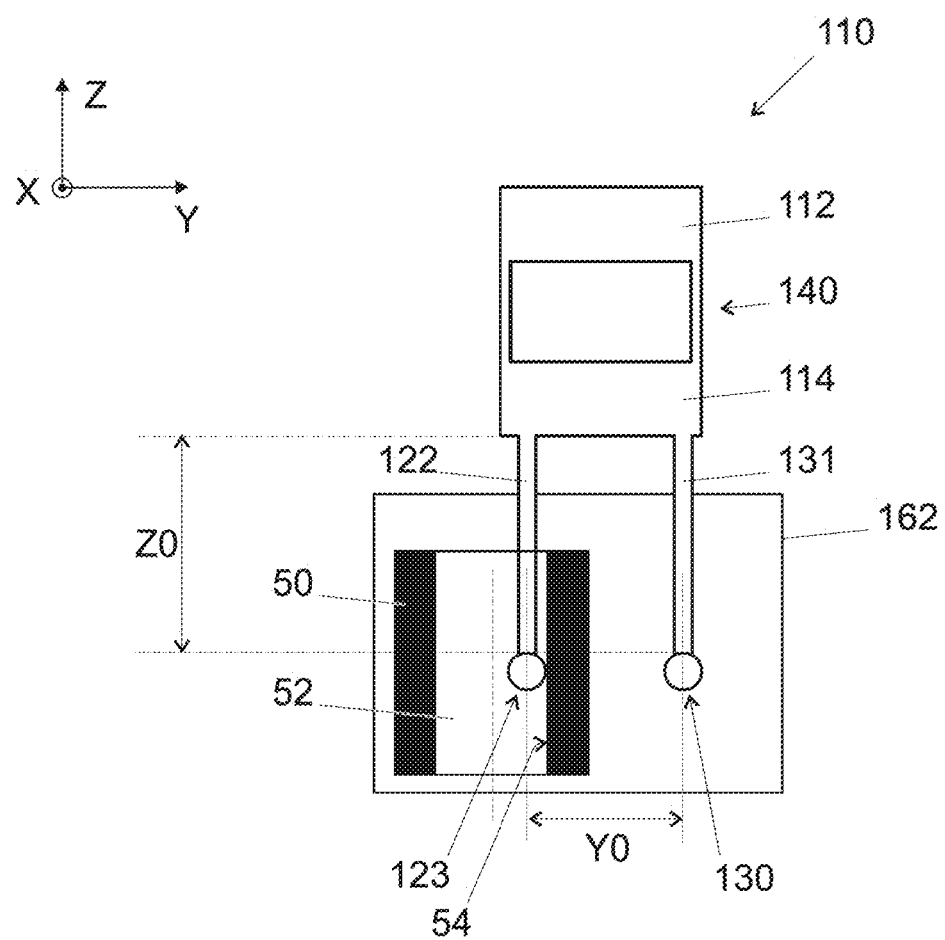
FIG. 6 is a sectional front view showing the principle of use of the measurement system from FIG. 1 to measure the internal profile of a part.
Figure 7:
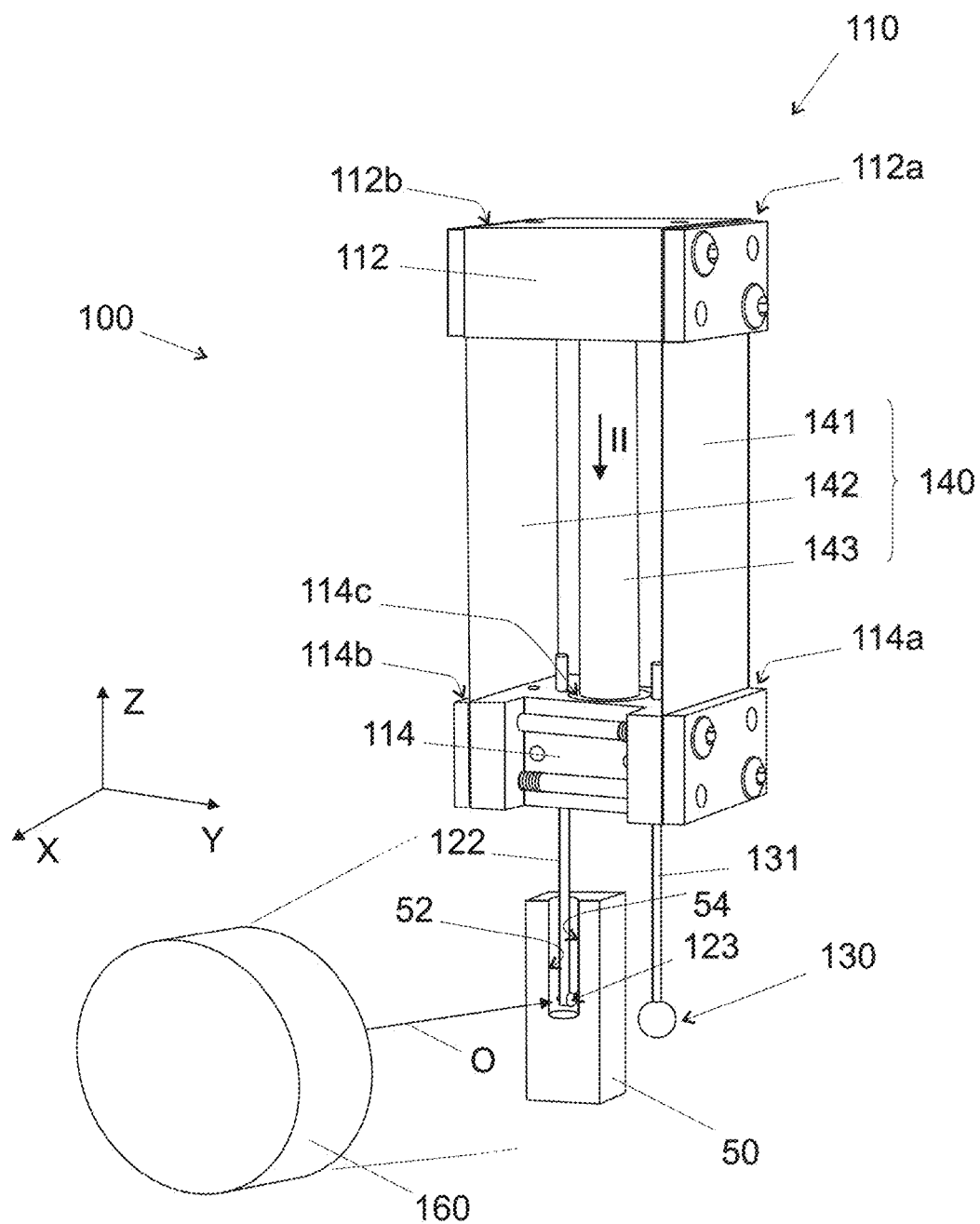
FIG. 7 is a diagrammatic perspective view of the principle of a measurement method using the measurement system according to the first embodiment of the present invention from FIG. 1 in the case of measuring the internal profile of a part.

The procedure is similar in the case of a hollow piece 50 (bore, recess, hole, opening, housing 52), placing the feeler head 123 of the probe 120 inside the part 50 (in the housing 52), against the internal face 54 of the part 50 while the first reference element 130 remains outside the part 50 as explained with reference to FIGS. 6 and 7. In FIG. 6 the part 50 includes an open hole 52 by way of a housing and in FIG. 7 the part includes a blind hole 52 by way of a housing. Preferably, this part 50 is a part of revolution around the axis Z, for the face to be measured, that is to say for the internal face 54 (and optionally also for the external face 51).

In this case, a method of this kind for measuring the internal profile of a part 50 includes the following steps (see FIGS. 6 and 7):
a) a sensor 110 is procured,
b) a hollow part 50 is procured the internal profile of which (internal face 54 of the housing 52) is to be determined,
c) an imaging device 160 (external sensor as in FIG. 7) is procured that is able to determine the position of the first reference element 130,
d) the feeler head 123 is placed inside said hollow part 50 with the feeler head 123 against the internal face 54 while the first reference element 130 remains outside said hollow part 50 (here, as seen in FIG. 6, the sensor 110 is in the rest position with the probe 120, and in particular the support portion 114 and the base 112, in the initial position, the support portion 114 and the base 112 being aligned one above the other on the axis Z), e) the sensor 110 is moved so that the feeler head 123 comes into (or remains in) contact with the internal face 54 of the part 50, and f) the new position of the first reference element 130 is identified by said imaging device 160, which enables determination of the new position of the feeler head 123 in the part 50, and g) the sensor 110 is moved to another location on the internal face 54 of the part 50 while the contact between the feeler head 123 and the internal face 54 of the part 50 is maintained, after which steps f) and g) are repeated until completion of the determination of the internal profile of the part 50.

The imaging device (external sensor) 160 is used to locate and to determine the position of the first reference element 130 and the variation of its position each time that the sensor 110 is moved relative to the face 51 or 54 of the part 50 to be measured, and therefore each time that the feeler head 123 is moved over the face 51 or 54 to be measured. In fact, in the case of FIG. 7, if the new position of the first reference element 130 corresponds strictly to a movement along Z in accordance with that of the sensor 110, then the new position of the feeler head 123, thus the new measured point of the internal profile of the part 50, remains in the same position on Y as previously (dY=0). In another case that is not shown, in which the face 54 to be measured is not parallel to the vertical direction Z but corresponds, for example, to a frustum of a cone of axis Z, then after movement on the vertical axis Z of the sensor 110 the new position of the first reference element 130 corresponds not only to a movement along Z in accordance with that of the sensor 110 but also to a movement along Y, the new position of the feeler head 123, thus the new measured point of the internal profile of the part 50, comes to a new position on Y relative to the preceding position of the sensor (dY is not 0). To this end the imaging device 160 includes an optical sensor. In this case an imaging device 160 may be used with its optical axis O is disposed in an orthogonal manner to the plane (Y, Z) (see FIG. 7), in order to be able to detect the movements of the first reference element 130 (and therefore, indirectly, of the feeler head 123) along the axis Y.

One such imaging device 160 is formed for example of an optical system, in particular a centred optical system, comprising a set of optical components and an image acquisition system. This kind of image acquisition system enables capture of photographs and/or videos and is for example a video camera or a still camera, in particular a digital still camera.

The imaging device 160 has intrinsic properties enabling it to make use of a field of view 162 that covers the first reference element 130 disposed outside the part 50. There can be seen in FIG. 6 the projection into the plane (Y, Z) of the field of view 162 or solid angle via which the imaging device 160 is sensitive to electromagnetic radiation (light). In the situation represented in FIG. 6 the field of view 162 of the imaging device 160 includes the first reference element 130 and also covers or encompasses the part 50 or at least the portion of the part 50 including the face 54 to be measured (internal face 54), in particular the portion of the external face that is situated in the plane (Y, Z) of the field of view 162 and corresponds to the face to be measured (if it is the external face 51) or opposite the face to be measured 54 (if it is the internal face 54).

Figure 8:
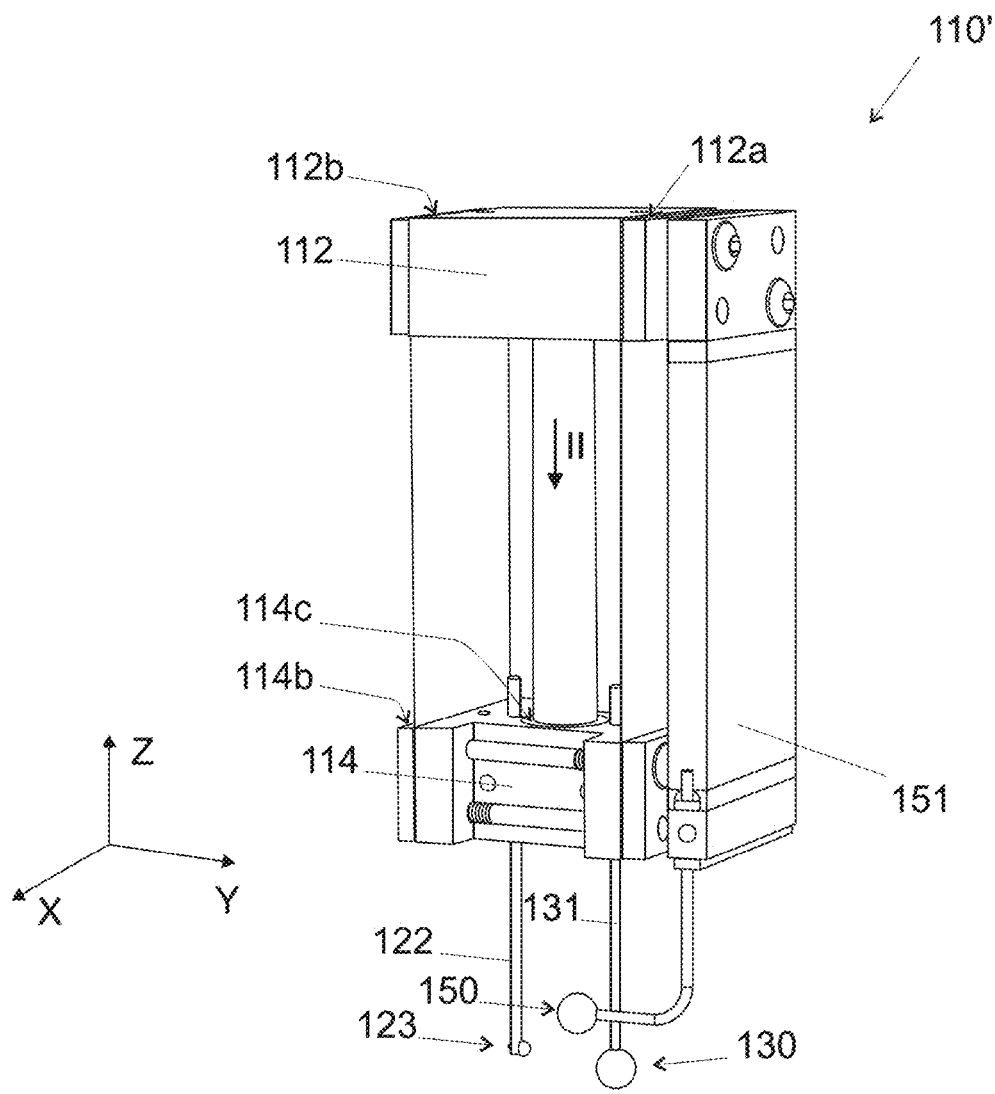
FIG. 8 is a front view of a variant of the measurement system according to the first embodiment of the present invention.

According to a variant of the first embodiment shown in FIG. 8, the sensor 110' further comprises a second reference element 150 mounted on and fastened to the base 112 and situated in the vicinity of the first reference element 130 and in all cases outside the part 50 (to the front of and above the first reference element 130 in the FIG. 8 arrangement). To be more precise, the rod of the second reference element 151 is fixed to the side of the base 112 forming the first end 112a of the base and situated vertically in line with the first end of the support portion 114 and the first reference element 130. Moreover, the shape and the length of the rod 151 of the second reference element that rigidly connects the base 112 to the second reference element 150 is arranged so as to avoid any contact with and any collision between the first reference element 130 and the second reference element 150. In this embodiment the second reference element 150 is a sphere of similar size to the sphere constituting the first reference element 130. In the present text, the sensor bearing the reference 110' thus corresponds to the case of the presence of a second reference element 150 interacting with the first reference element 130 to allow the measurement to be made. In fact, it will be understood that the second reference element 150 being fastened to (and integral with) the base 112, it is fixed relative to this base 112 whereas the probe 120 and, in particular, the first reference element 130 is mobile relative to the base 112.

Thanks to this second reference element 150 it is possible to detect the offset along the axis Y of the feeler head 123, said offset (not shown) being the result of flexing of the feeler rod 122 when the feeler head 123 bears against a face 51 or 54 to be measured. In this case, in the measurement methods described above, there is further procured a second reference element 150 mounted on and fastened to the base 112 and situated in the vicinity of the first reference element 130, and in which during the measurement step f) there is further detected relative movement (in particular along the axis Y) between the first reference element 130 and the second reference element 150, and this relative movement is taken into account in determining the position of the feeler head 123. It is therefore clear that the field of view 162 of the imaging device 160 also includes the second reference element 150.

This kind of second reference element 150 is also useful for measuring the external profile because the same phenomenon of flexing about the axis Y of the feeler rod 122 is liable to occur, again without any flexing of the rod 131 of the first reference element since the first reference element 130 is not in contact with any surface and is therefore not subjected to any bearing force that could generate a return force on the part of the surface and therefore deformation by flexing of the rod 131 of the first reference element.

Figure 9:
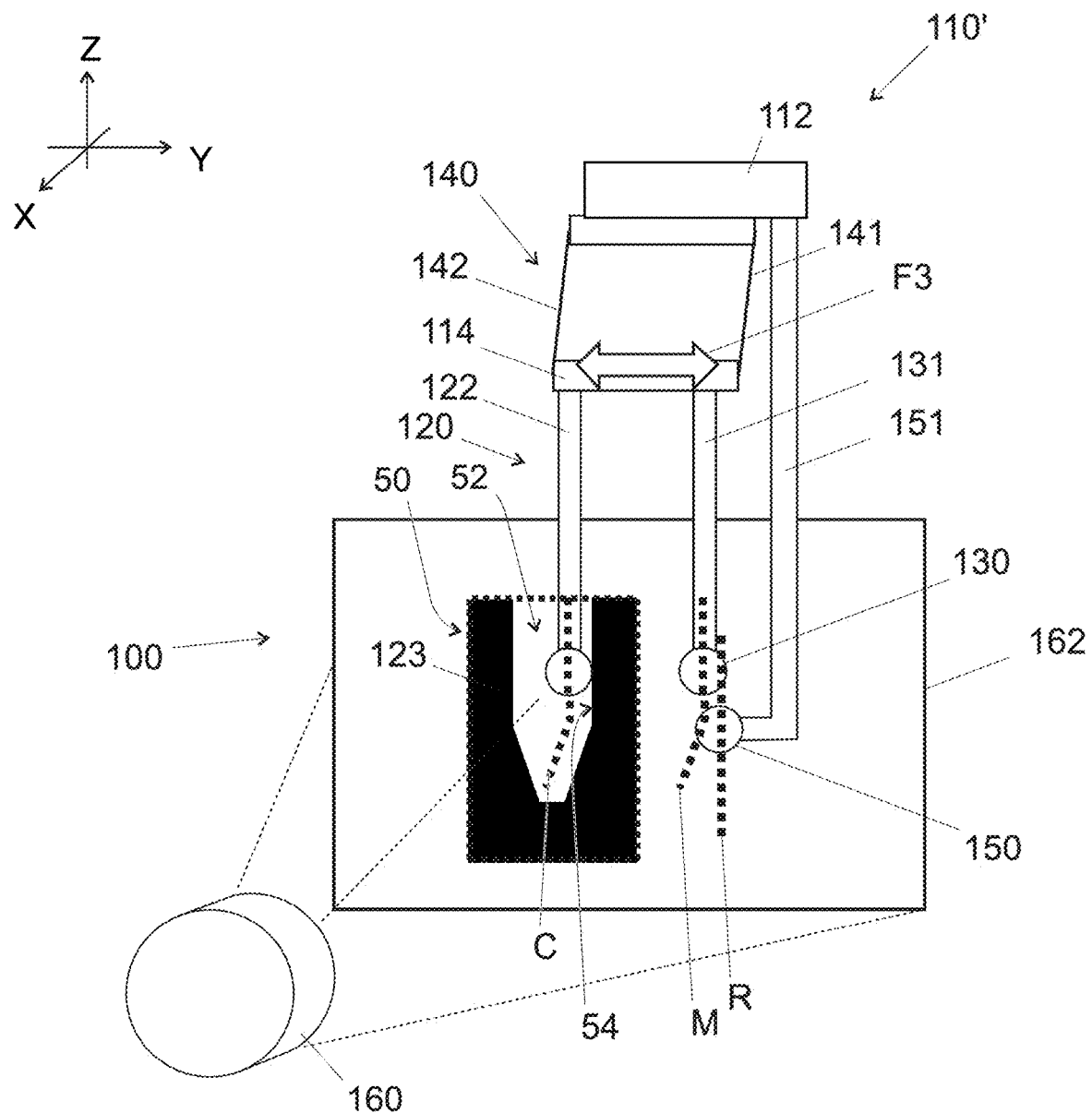
FIG. 9 is a more diagrammatic front view of the variant of the measurement system according to the first embodiment of the present invention showing the principle of the measurement effected in the case of an internal profile of a part.
Figure 10B:
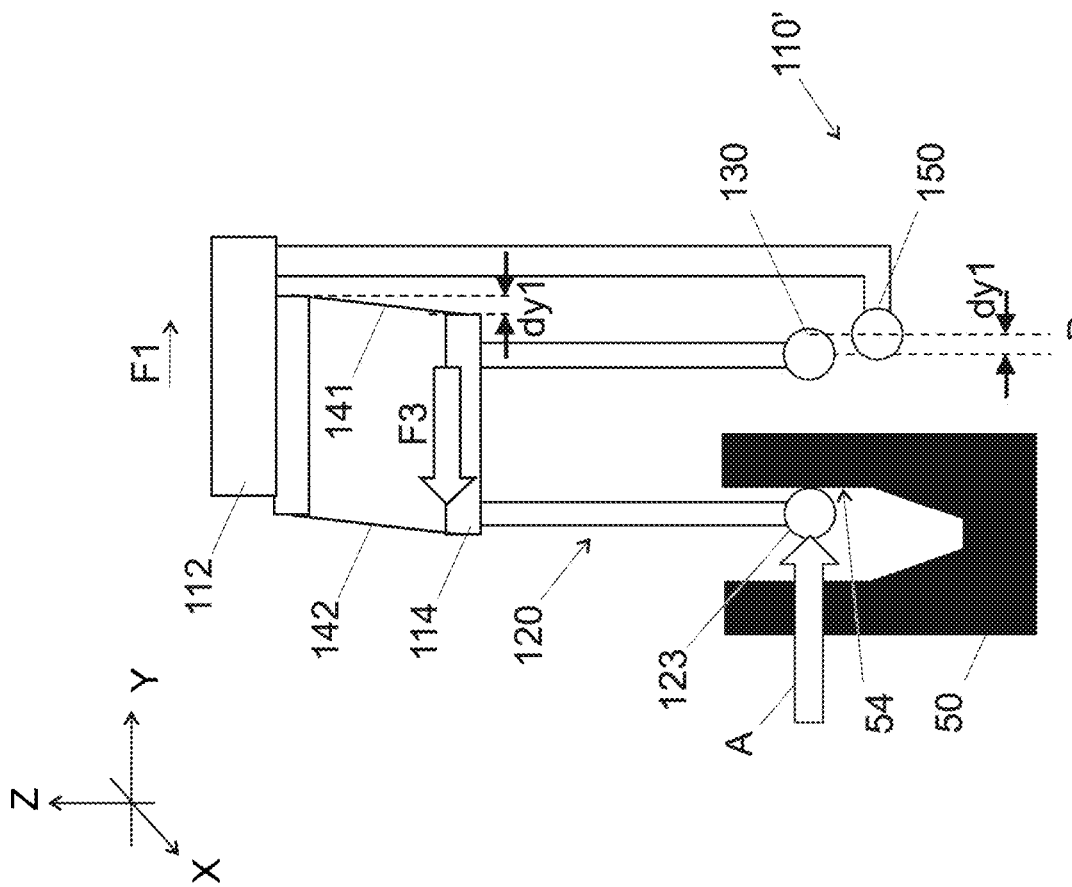
FIGS. 10A and 10B show steps of the measurement method using the FIG. 9 variant of the measurement system according to the first embodiment of the present invention.
Figure 10A:
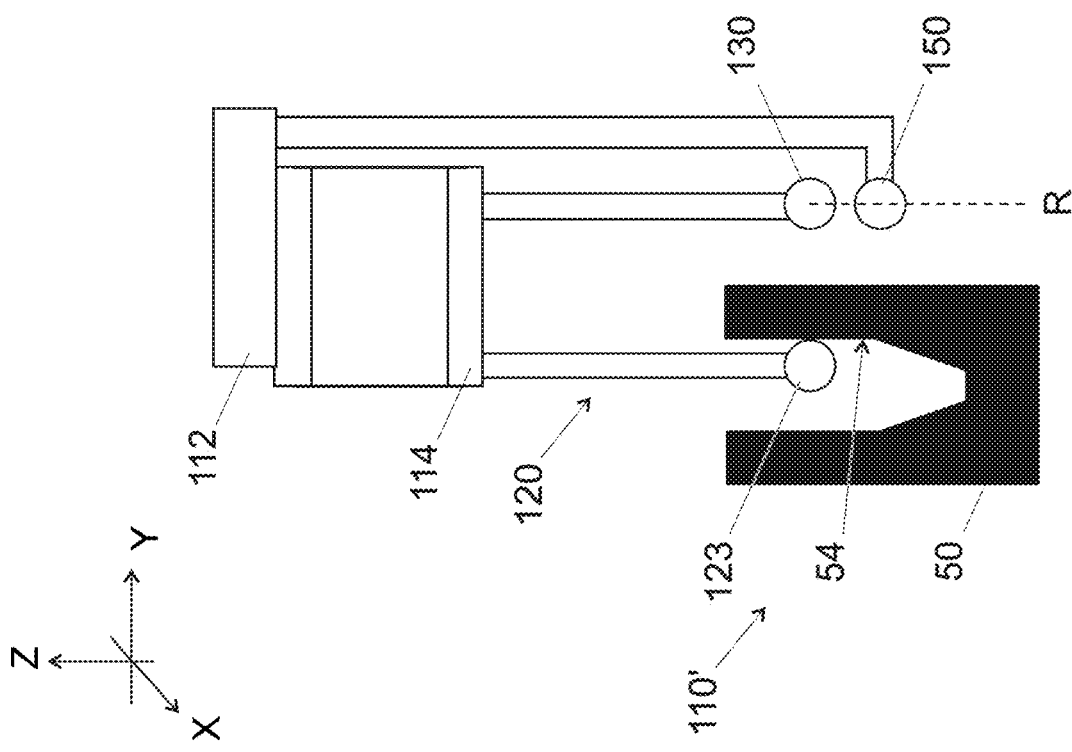

In the case of this variant of the first embodiment, the method for measuring the internal profile of a part 50 includes the following steps (see FIGS. 9, 10A and 10B):

a) a sensor 110' as described above is procured, b) a hollow part 50 is procured the internal profile of which (internal face 54 of the housing 52) is to be determined, c) an imaging device 160 (external sensor as in FIG. 9) is procured that is able to determine the relative position between the first reference element 130 and the second reference element 150, d) the feeler head 123 is placed inside said hollow part 50 with the feeler head 123 against the internal face 54 while the first reference element 130 and the second reference element 150 remain outside said hollow part 50 (here, as seen in FIG. 10A, the sensor 110' is in the rest position with the support portion 114 and the base 112 in the initial position aligned one above the other on the axis Z, and with the first reference element 130 and the second reference element 150 aligned one above the other on the axis Z on a reference line R), e) the sensor 110' is moved relative to the part 50 along the axis Y (arrow F1, FIG. 10B) so that the feeler head 123 comes into (or remains in) contact with the internal face 54 of the part 50: this generates a bearing force (arrow A) of the first reference element 130 against the internal face 54 and deformation of the leaf springs 141 and 142 with an equal and opposite movement (arrow F3) of the support portion 114 relative to the base 112, which generates an offset dY1 in the direction Y of the first reference element 130 relative to the second reference element 150 (FIG. 10B with an offset in the direction Y, in the direction of the arrow F3 of the entire probe 120), and f) the position of the first reference element 130 relative to the second reference element 150 is identified by said imaging device 160, which enables determination of the position of the feeler head 123 in the part 50, and g) the sensor 110' is moved in direction Z (vertical direction) to another location on the internal face 54 of the part 50 while the contact between the feeler head 123 and the internal face 54 of the part 50 is maintained, after which steps f) and g) are repeated until completion of the determination of the internal profile of the part 50. In this way, as seen in FIG. 9, there is constructed point by point as and when successive positions are adopted by the first reference element 130 a measurement line M representing the internal contour of the internal face 54. It is clear that there is used as a reference the vertical reference line R passing through the second reference element 150 (for example through its centre or some other point), and that the measurement line M is a transposition to the outside of the part 50 of the line C (FIG. 9) of the internal contour (internal profile) to be measured.

In this first embodiment the sensor 110 or 110' forms, with the base 112 forming the fixed reference in the sensor, a parallel deformation structure comprising one above the other and in parallel the base 112 and the support portion 114 that are each undeformable and the two leaf springs 141 and 142 that are deformable in the horizontal direction Y. This enables definition of a measurement axis, here the axis Y, and application of a bearing force of the feeler head 123 on the part 50. This bearing force depends on the characteristics of the leaf springs 141 and 142 (length, width, thickness) and the deformation thereof.

Figure 11:
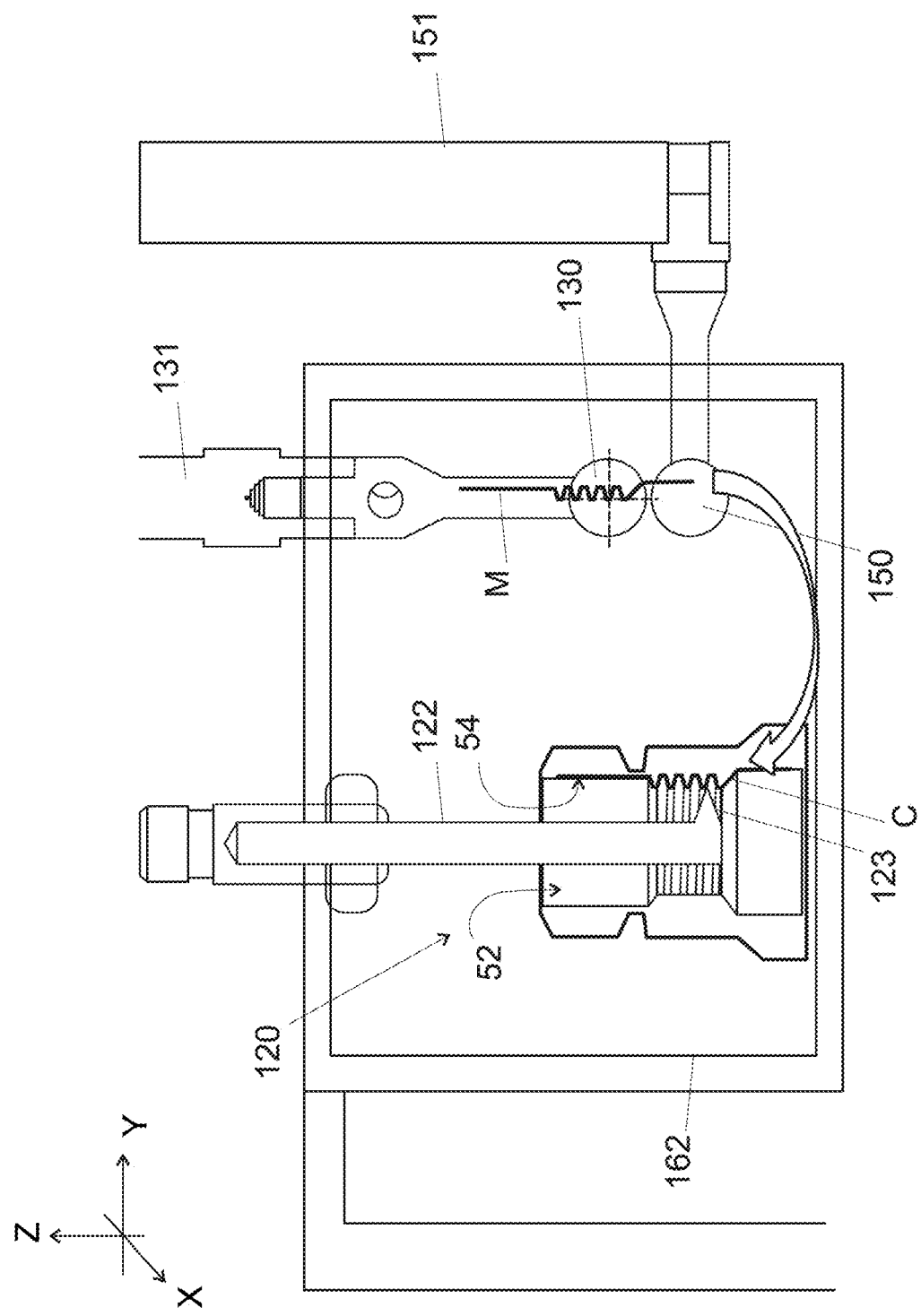
FIGS. 11 and 12 show diagrammatically the general principle of the measurement system according to the present invention.

In this first embodiment, but also generally, and as seen in FIG. 11, the invention enables very accurate following of the internal (or external) contour of the part 50 along the internal face 54 (external face 51) by the feeler head 123 of the probe 120 that remains in contact with the part 50. In the embodiments described reconstruction and following of the contour are effected in the vertical direction Z (orientation of the measurement line M and of the contour line C to be reconstituted), but effecting this reconstitution and this following of the contour in some other direction may be envisaged, in particular in a horizontal direction, for example in the direction X, or some other direction in the plane (X, Y), or again in a first of the foregoing directions for a contour portion and then a second of the foregoing directions to change contour portion and revert to the first of the foregoing directions to view this new contour portion. Despite the fact that this feeler head 123 is invisible from outside the part 50, owing to its position inside the housing 52, the invention enables its movement on the face to be measured 54 to be visualized via the first reference element 130. The guide system 140 enables movement of the feeler head 123 relative to the base 112 in one or more directions.

Via the imaging device 160 which has a field of view 162 including the first reference element 130 and the external contour of the part and/or the second reference element 150, the invention enables capture of successive images during the movement of the first reference element 130 and measurement of its position relative to the outer contour of the part 50 (and possibly relative to the second reference element 150). Those images enable point by point production of the measurement line M that reconstitutes the line C of the internal contour to be measured. This is made possible because the measurement system transfers to the first reference element 130 that is outside the part the movement of the feeler head 123 when it follows the internal (or external) contour of the part 50 and therefore the internal (or external) profile of the part 50. The measurement line M in FIG. 9 corresponds to the internal profile of the part 50 in the vertical direction Z at a location (a point) on the part (the housing 52) in a horizontal plane parallel to the plane (X, Y). To reconstitute all of the internal (external) profile of the part 50, that is to say all of the surface of the internal (external) face 54, the measurement steps must be repeated to reconstitute another measurement line M' passing through another location (point) of the part (the housing 52) in that horizontal plane parallel to the plane (X, Y), and so on for the necessary number of points. Reconstituting the measurement line M amounts to reproducing outside the part 50 the contour of a "slice" of the part 50 in a plane parallel to the vertical axis Z and orthogonal to the plane (X, Y). By also reconstituting other slices, each slice of the contour of the part 20 being situated in another plane parallel to the vertical axis Z and orthogonal to the plane (X, Y), offset by an angle theta of the plane of the slice previously reconstituted, there is obtained by image addition the juxtaposition of the measurement lines M, M', etc. in a three-dimensional space. This is all the more rapid in the case of a part 50 of revolution (rotational symmetry) that may be reconstituted with a few slices.

A preliminary step of preliminary calibration is effected in order to determine exactly the relative position between the first reference element 130 and the position of the feeler head 123, which enables the measurement line M to be transferred thereafter to obtain the line C of the internal contour that is to be measured and that is invisible from outside the part. To this end, according to one possibility, the imaging device 160 is used to capture an image of the sensor 110 or 110' without the part 50 in order to define the relative position of the first reference element 130 and the feeler head 123 in the rest position of the sensor 110 or 110'.

Figure 12:
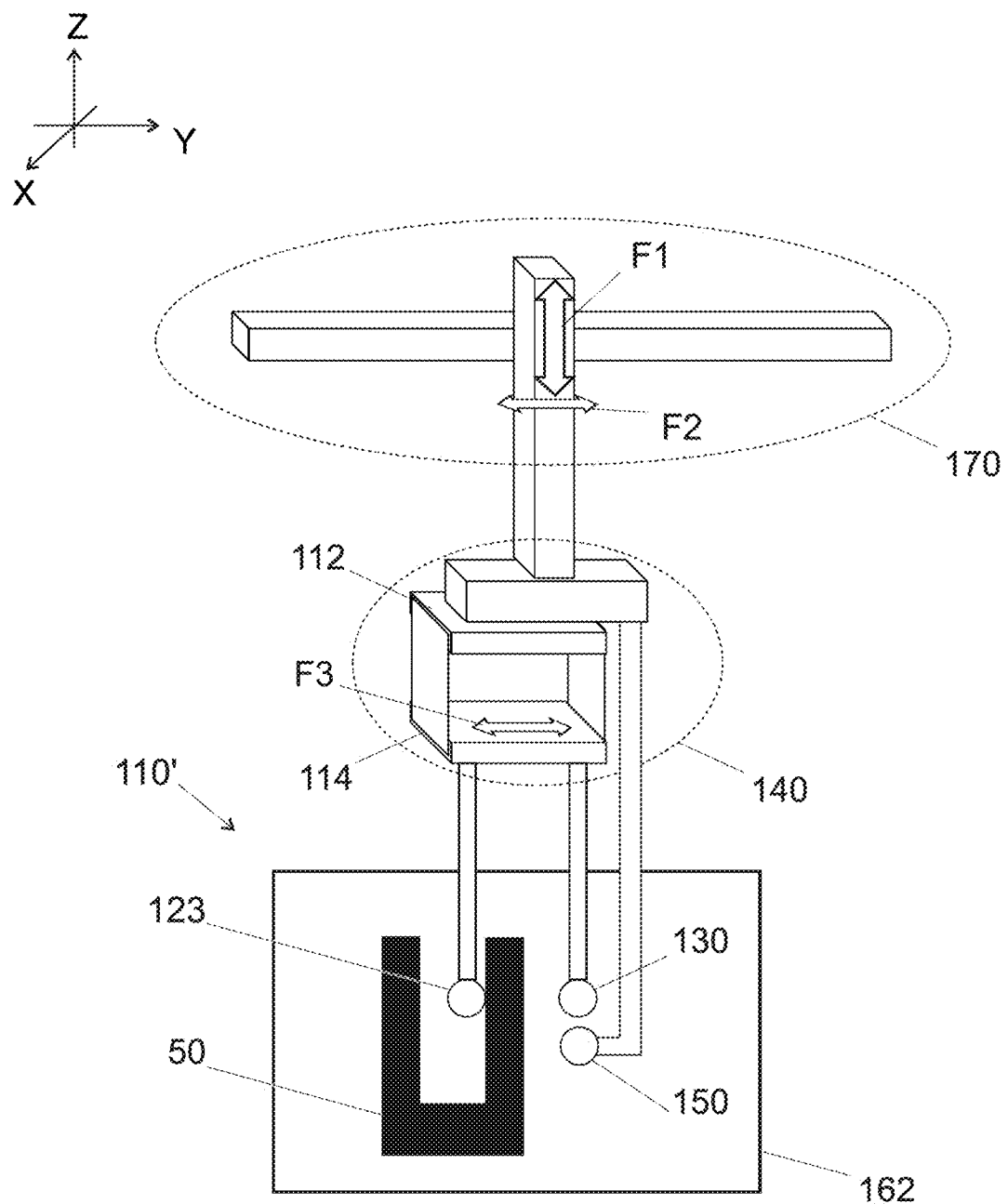

The sensor 110 or 110' may be held by its base 112 by a holding member or a support member (represented diagrammatically in FIG. 12) and moved by any movement system such as an articulated arm controlled by control systems and motorized shafts 170 in order to enable relative movement between the sensor 110 or 110' and the part 50:

horizontally along the axis Y in the direction of the arrow F1 in FIG. 12, and/or vertically along the axis Z in the direction of the arrow F2 in FIG. 12.

Figure 13B:
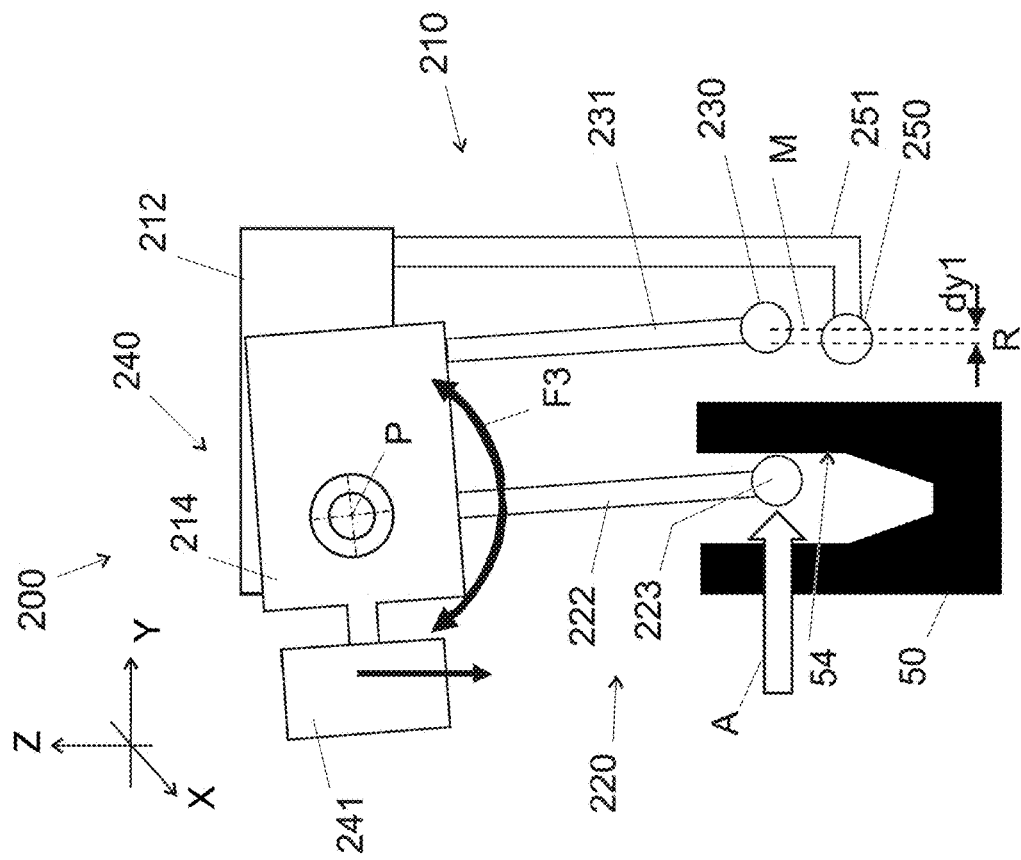
FIGS. 13A and 13B show the steps of measurement using a measurement system according to a second embodiment of the present invention.
Figure 13A:
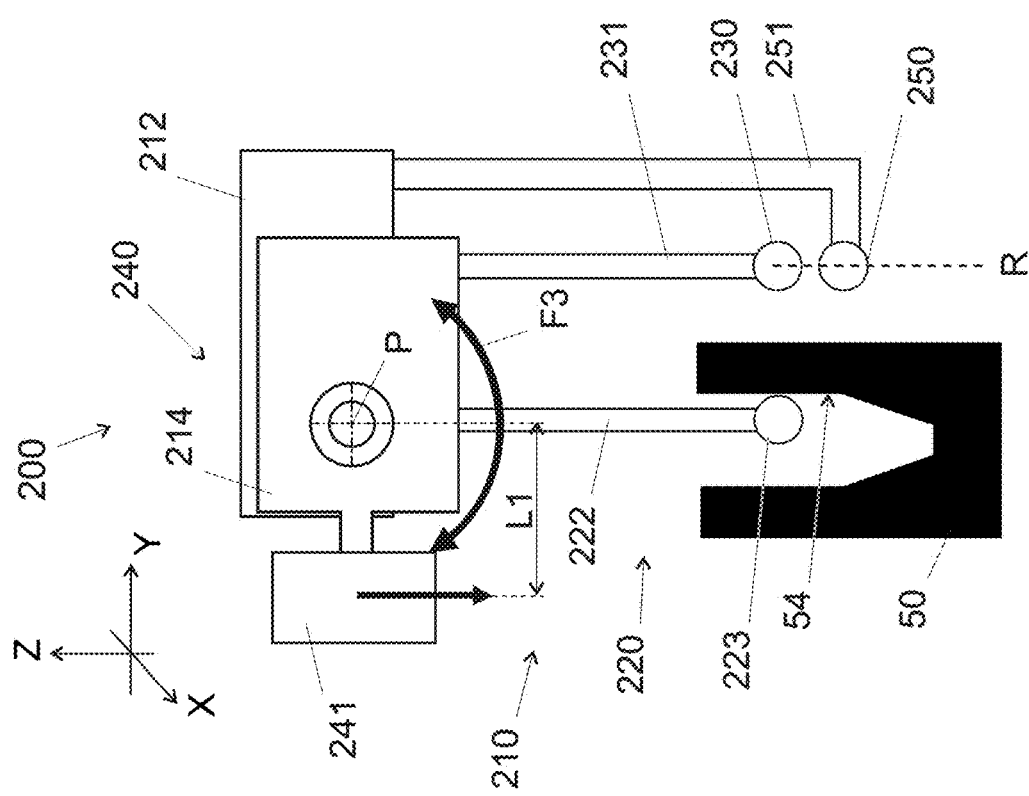

Refer now to FIGS. 13A and 13B representing a measurement system 200 in accordance with a second embodiment of the invention. In this case, the elements of the measurement system 200 similar to those of the first embodiment described above (measurement system 100)

carry a reference symbol which is that of the first embodiment increased by 100. There is a sensor 210 comprising:

- a support portion 214 extended vertically toward the bottom of a feeler rod 222 carrying at its free end a feeler head 223 and a parallel rod of a first reference element 231 carrying at its free end the first reference element 230,
- a base 232 extended vertically toward the bottom of a rod 251 of the second reference element carrying at its free end a second reference element 250. A variant that is not shown could not include this second reference element 250 but only the base 232.

The support portion 214 and the base 212 are placed one in front of the other (in the horizontal direction X) with a guide system 240 allowing movement in rotation between them about an axis P parallel to the horizontal direction X. This direction X is orthogonal to the horizontal measurement direction Y separating the feeler head 223 and the first reference element 230. To this end the guide system 240 connecting the support portion 214 and the base 212 may be designed in a number of ways and in particular include a shaft (not shown) parallel to the axis P and disposed (vertically in FIGS. 13A and 13B, i.e. in the direction Z) in line with the feeler head 223. This shaft passes through the support portion 214 and the base 212 and is fixedly mounted relative to either the support portion 214 or the base 212 and is mounted mobile relative to the other of either the support portion 214 or the base 212, which constitutes a bearing. The guide system 240 further optionally includes a spiral spring (not shown) with its axis parallel to the axis P (and possibly coaxial with the axis P) surrounding said shaft with its inner end fixed to the shaft and its outer end fixed to the other of the support portion 214 or the base 212. This movement in rotation of the guide system 240 about the axis P (see the arrow F3 in FIGS. 13A and 13B) is facilitated by the presence of a weight 241 connected to the outside of the support portion 214 with an offset in the direction Y between the support portion 214 and the weight 241. This weight 241 therefore serves as a counterweight to the assembly formed of the feeler head 223 and the first reference element 230. The mass of this weight 241 may be modified and likewise the distance L1 that separates it from the shaft (axis P) and therefore from the feeler head 223 so as to form an adjustable lever arm.

In this case the probe 220 (feeler head 223 at the free end of the feeler rod 222) is connected to the fixed part of the measurement system by a guide system 240 allowing only rotation relative to an axis P orthogonal to the measurement direction Y. Here it is therefore a question of a pivoting guide system 240. Other designs are, naturally, possible for this guide system pivoting between the probe 220 and the fixed part of the sensor 210 (for example, the base 212), forming a guide system 240 allowing a rotational movement between them about an axis P parallel to the horizontal direction X.

Thus a pendulum type structure is formed that functions in the same manner as the sensor 110' according to the variant of the first embodiment and enables definition of a measurement axis in the direction Y. This structure enables provision of a constant and extremely weak bearing force A of the feeler head 223 on the internal face 54 (or external face 51) of the part regardless of the deformation of the spiral spring. In this case, the guide system 240 allows a degree of freedom of the probe 220 that is a movement in rotation about the axis P parallel to the axis X. The probe 220 (in particular the support portion 214 and the elements attached to it) is returned to its rest position by simple gravity once the feeler head 223 is no longer in contact with a face of the part 50. The use of this sensor 210 in combination with an imaging device 160 enables a part profile measurement system to be formed using a measurement method identical to that already described with reference to the first embodiment.

Such an arrangement forms a measurement system 200 in which:

- the part 50 is hollow and the internal contour of the part 50 forms a face 54 of revolution around an axis of revolution (this axis of revolution is, for example, parallel to the main axis of the sensor 110, for example along the axis Z),
- the probe 220 includes a feeler head 223 capable of detecting, by contact, the internal contour of the part 50 and of following the internal contour of the part 50 with a degree of freedom in a measurement direction (direction Y) perpendicular to said axis of revolution, this measurement direction (direction Y) separating the feeler head 223 and the first reference element 230 from one another,
- the guide system 240 includes a pivoting connection between the probe 220 and the base 212 about an axis (P) perpendicular to said axis of revolution and orthogonal to the measurement direction (direction Y). It will be understood that this measurement system 200 further includes a second reference element 250 fastened to (and integral with) the base 212 and situated outside the part, the imaging device 160 being capable of taking an image further comprising the second reference element 250, whereby the variation in the relative position between the first reference element 230 and the second reference element 250 allows measurement of the profile of the internal contour of the part 50.

An arrangement such as that according to FIGS. 13A and 13B allows the implementation of a measuring method as described above, in which the following steps are further effected:

- the images taken by the imaging device 160 are compared in order to detect the relative movement between the first reference element 130 and the portion of the outside of the part 50 in said measurement direction, and
- a relative movement between the probe 120 and the base 112 is deduced therefrom, which corresponds to an offset in the measurement direction along the measured profile of the part 50.

In particular, when the part 50 is hollow and the internal contour of the part 50 forms a face 54 of revolution around an axis of revolution (notably an axis of revolution parallel to said main axis Z of the sensor 110),

- the probe 220 includes a feeler head 223 capable of detecting, by contact, the internal contour of the part 50 and of following the internal contour of the part 50 with a degree of freedom in a measurement direction Y perpendicular to said axis of revolution (notably a measurement direction Y perpendicular to the main axis Z of the sensor 110), said measurement direction Y separating the feeler head 223 and the first reference element 230 from one another,
- the guide system 240 includes a pivoting connection between the probe 220 and the base 212 about an axis P perpendicular to said axis of revolution and orthogonal to the measurement direction Y.

In the embodiment illustrated in FIGS. 13A and 13B, the sensor 210 further includes a second reference element 250 fastened to the base 212 and situated outside the part 50, the imaging device 160 being capable of taking an image further comprising the second reference element 250, whereby the variation in the relative position between the first reference element 230 and the second reference element 250 allows measurement of the profile of the internal contour of the part 50.

Figure 14B:
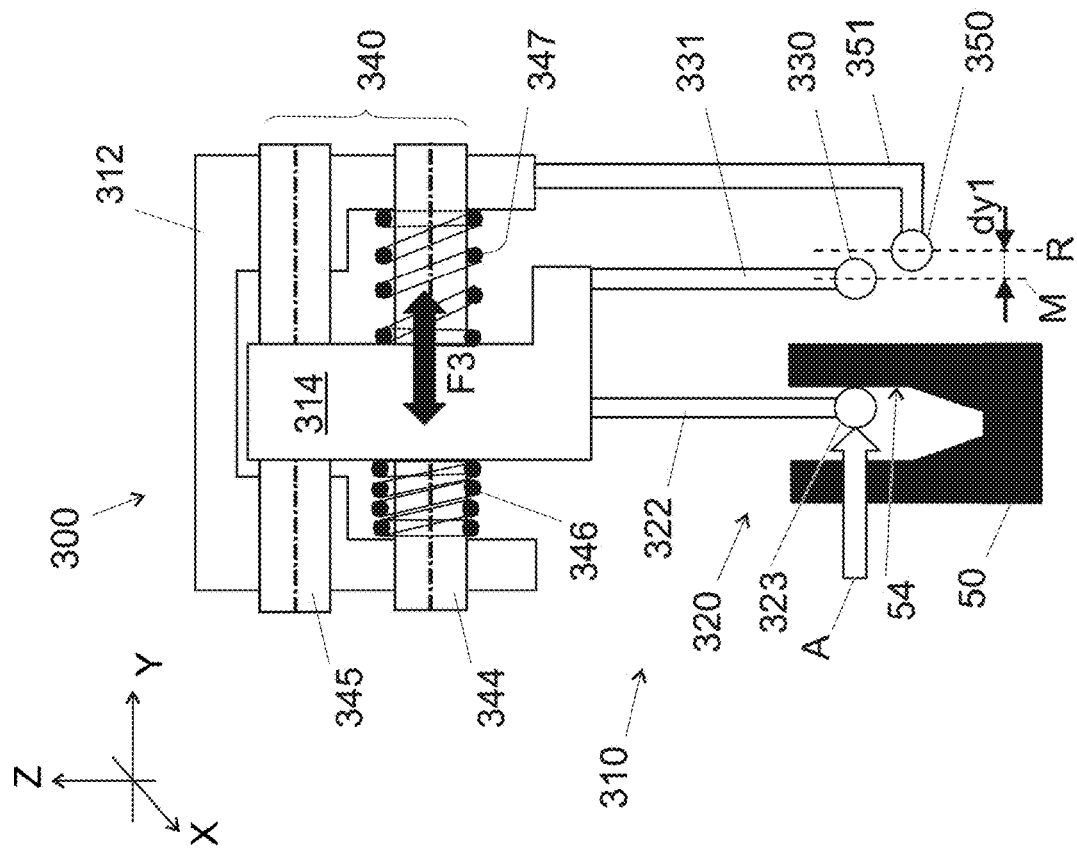
FIGS. 14A and 14B show the steps of measurement using a measurement system according to a third embodiment of the present invention.
Figure 14A:
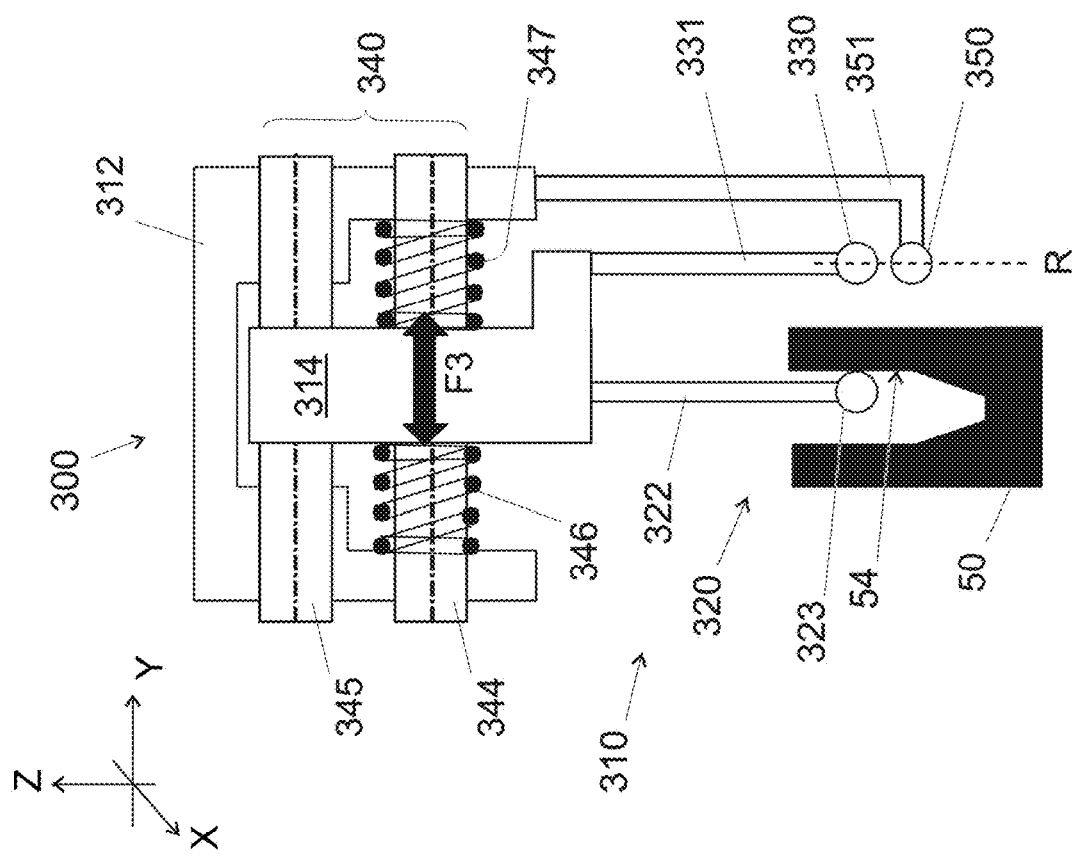

Refer now to FIGS. 14A and 14B representing a measurement system 300 in accordance with a third embodiment of the invention. In this case the elements of the measurement system 300 similar to those of the first embodiment described above carry a reference sign which is that of the first embodiment increased by 200. There is a sensor 310 comprising:
- a support portion 314 extended vertically toward the bottom of a feeler rod 322 carrying at its free end a feeler head 323 and a parallel rod of a first reference element 331 carrying at its free end the first reference element 330, this support portion 314 having an L general shape with the stem of the L oriented in the vertical direction Z and the base of the L parallel to the direction Y and carrying the feeler head 323 and the first reference element 330,
- a base 312 extended vertically toward the bottom of a second reference element rod 351 carrying at its free end a second reference element 350. A variant that is not shown could not include this second reference element 350 but only the base 312.

The support portion 314 and the base 312 are mobile in translation relative to one another in the direction of the horizontal measurement axis Y. Here the base 312 is stirrup-shaped, in particular in the shape of an inverted U, with the base of the U parallel to the direction Y and the two branches of the U parallel to the direction Z. One of the two branches of the U of the base 312 is extended by the second reference element rod 351 and by the second reference element 350. Two guide parts parallel to one another and to the direction Y connect the two branches of the U to one another to enable movement in translation of the support portion 314. To be more precise, a rail 344 forms the first guide part in the form of a rod that preferably has a circular section and on which the support portion 314 is mounted at the level of an opening through the portion of the rod of the L. Also, a slide 345 forms the second guide part in the form of a rod parallel to the rail 344. To cooperate in translation with the slide 345 that other portion of the rod of the L includes for example a notch so as partly to surround the slide 345 or a through-opening forming a passage for the slide 345.

In order for the feeler head 323 to exert a bearing force (arrow A) on the internal (or external) face 54 of the part that is for example oriented in the vertical direction and to enable return into the rest position (FIG. 14A) of the support portion 314 relative to the base along the axis Y, two compression springs 346 and 347 are used that form return means for the support portion 314. These springs 346 and 347 are mounted on the rail on respective opposite sides of the support portion 314. These springs 346 and 347 have an end in contact with and bearing on the support portion 314 (one spring for each face) and an end in contact with and bearing on the base 312 (each spring coming to bear on a different branch of the U of the base 312). As in the example shown in FIGS. 14A and 14B, these are for example two coil springs 346 and 347. In the example shown in FIGS. 14A and 14B these are two springs 346 and 347 of the same length and the same resistance to compression per unit length, which places the rest position (see FIG. 14A) of the support portion 314 between the two arms (the ends in the measurement direction Y) of the base 312. However, the geometric and/or physical characteristics of each spring 346 and 347 may be adapted in accordance with specific requirements. It is clear that with this arrangement the bearing force A of the feeler head 323 on the part 50 depends on the deformation of the springs 346 and 347: thus in the case of FIG. 14B the feeler head 323 bears on the internal face 54 of the part 50, in the area on the right in the figure, on a portion of the vertical internal face 54, as seen by the imaging device; in this case, the sensor 310 is offset in translation toward the right relative to the part 50, which has moved the support portion 314 relative to the base 312 toward the left by the distance dY1 (see FIG. 14B) and compressed (more) the first spring 346 situated to the left of the support portion 314. This distance dY1 is that between the first reference element 330 fastened to the support portion 314 and the second reference element 350 fastened to the base 312.

Refer now to FIGS. 15A and 15B representing a measurement system 400 in accordance with a fourth embodiment of the invention. In this case the elements of the measurement system 400 similar to those of the measurement system 300 according to the third embodiment described above carry a reference sign which is that of the third embodiment increased by 100. There is a sensor 410 comprising:
a support portion 414 extended vertically toward the bottom of a feeler rod 422 carrying at its free end a feeler head 423 and in parallel by a first reference element rod 431 carrying at its free end the first reference element 430, this support portion 414 having the general shape of a U on its side with the base of the U oriented in the vertical direction Z, the upper branch of the U oriented in the direction Y and the lower branch of the U (carrying the feeler head 423 and the first reference element 430) also oriented parallel to the direction Y;
a base 412 extended vertically toward the bottom of a second reference element rod 451 carrying at its free end a second reference element 450. A variant that is not shown could not include this second reference element 450 but only the base 412.

The support portion 414 and the base 412 are mobile in translation relative to one another toward the measurement axis which this time is the vertical axis Z. Here the base 412 is also stirrup-shaped, in particular in the shape of a U lying its side, with the base of the U parallel to the vertical axis Z and the two branches of the U parallel to the direction of the axis Y; the opening of the U of the support portion 414 faces toward the base 412; the opening of the U of the base 412 faces toward the support portion 414. One of the two branches of the U of the base 412 (lower branch) is extended by the second reference element rod 451 and by the second reference element 450 and is partly disposed in the housing delimited by the support portion 414, at least as projected into the plane of FIG. 15A or 15B, that is to say as seen in the direction X by the imaging device 160 (not shown). Two guide parts parallel to one another and to the direction Z connect the two branches of the U of the base 412 to one another to enable movement in translation of the support portion 414. To be more precise a rail 444 forms the first guide part in the form of a rod that preferably has a circular section and on which the support portion 414 is mounted at the level of an opening through the portion of the other of the two branches of the U of the base 412 (upper branch). Also, a slide 445 forms the second guide part in the form of a rod parallel to the rail 444. To cooperate in translation with the slide 445 this other portion of the other of the two branches of the U of the base 412 (upper branch) includes for example a notch so as partly to surround the slide 445 or a through-opening forming a passage for the slide 445.

In order for the feeler head 423 to exert a bearing force (arrow A) on a portion of the internal (or external) face 54 of the part that is oriented for example in the horizontal direction and to enable return to the rest position (FIG. 15A) of the support portion 414 relative to the base 412 along the vertical axis Z, two compression springs 446 and 447 are used forming return means for the support portion 412. These springs 446 and 447 are mounted on the rail 444 on respective opposite sides of the upper branch of the support portion 414. These springs 446 and 447 have an end in contact with and bearing on the support portion 414 and an end in contact with and bearing on the base 412 (each ring coming to bear on a different branch of the base 412). As in the example represented in FIGS. 15A and 15B, these are for example two coil springs 446 and 447. In the example represented in FIGS. 15A and 15B these are two springs 446 and 447 of the same length and the same resistance to compression per unit length, which places the rest position (see FIG. 15A) of the support portion 414 between the two arms (the ends in the measurement direction Z) of the base 412. However, the geometric and/or physical characteristics of each spring 446 and 447 may be adapted in accordance with specific requirements. It is clear that with this arrangement the bearing force A of the feeler head 423 on the part 50 depends on the deformation of the springs: thus in the case of FIG. 15B the feeler head 423 bears on the internal face 54 of the part 50 in the area on the right in the figure, which includes a re-entrant shoulder, on a horizontal surface portion that here is as seen by the imaging device; in this case, there has been offset in translation upwards in the direction Z of the sensor 410 relative to the part 50, which has moved the support portion 414 relative to the base 412 downward by the distance dZ1 (see FIG. 15B) and compressed (more) the second spring 447 situated under the upper branch of the support portion 414. This distance dZ1 is that between the first reference element 430 fastened to the support portion 414 and the second reference element 450 fastened to the base 412.

As represented diagrammatically in FIG. 16 an imaging device 160 used in the measurement system according to the invention, for example in accordance with one of the embodiments represented in the Figures and described above, includes:
  a video camera and a set of lenses enabling the focal plane of this imaging device 160 to be placed on the part 50 and on the first reference element 130 (230, 330, 430) but also where applicable on the second reference element 150 (250, 350, 450). In order to improve the contrast of the image captured by the imaging device 160 in its field of view 162, in an embodiment as represented in FIG. 16 a light source 164 is placed to provide backlighting relative to the object (or objects) observed by the imaging device 160. In this way the object or objects present in the field of view 162 (of the video camera) of the imaging device 160 is/are placed between the imaging device 160 and the light source 164. This backlighting produces an image such as that in FIG. 17A (for a sphere portion that is for example the feeler head), with a grey or dark/light gradation between the part and the outside of the part. Processing this image (FIGS. 17B to 17F) enables an image to be obtained after processing I that enables very accurate delimitation of the position of the contour of that object or those objects seen by the imaging device 160 (FIG. 17F).

There has been described above a technique in which the determination of the position of the first reference element 130 (and where applicable the position of the second reference element 150) is/are effected in an optical manner by the imaging device 160. The present invention may equally be applied to determining the position of the first reference element 130 (and where applicable the position of the second reference element 150) in some other manner and in particular by contact between some other type of sensor and the first reference element 130 and where applicable the position of the second reference element 150. It should be noted that if the position of the first reference element 130 and where applicable the position of the second reference element 150 is/are determined in an optical manner, this enables dispensing with an additional deformation of a rod 131 of the first (second reference element 130 and therefore an offset of the first (second reference element 130 that would modify the measurement.

Points in common may be noted between some or all of these embodiments, in particular between the measurement system 100 of the first embodiment (with the sensor 110 or the variant with the sensor 110' coupled with the second reference element 150), 200 of the second embodiment and 300 of the third embodiment, said guide system 140, 240, 340 being a flexible system at least in the direction Y. In the case of the measurement system 400 of the fourth embodiment said guide system 440 is a flexible system at least in the direction Z.

Also, in particular between the measurement system 100 of the first embodiment, 200 of the second embodiment, 300 of the third embodiment and 400 of the fourth embodiment, any one or more of the following dispositions A to J applies/apply to a sensor that also constitutes subject matter of the present invention or a measurement system that constitutes subject matter of the present invention and including a sensor of that kind:

*Disposition A: the sensor forms a mechanical feeler device adapted to be used to determine the internal profile of a part 50 and comprising:
    a base,
    a support portion elastically connected to the base by a guide system,
    a feeler head mounted via a feeler rod on the support portion,
    a reference head mounted via a reference rod on the support portion, in which:
    the reference head and the feeler head are situated on the opposite side of said support portion opposite said base,
    the reference rod and the feeler rod are disposed in a plane Y, Z and, in the rest position of the device, are parallel to one another and to a direction Z.

*Disposition B: said guide system is such that when the feeler head comes into contact with and remains in contact with a surface of the part relative movement between the feeler head and the base is at least partly transmitted to the reference head via the guide system.

*Disposition C: said guide system is such that when the feeler head comes into contact with and remains in contact with a surface that is not parallel to the plane Y, Z any relative movement between the feeler head and the base in the direction Y is at least partly transmitted to the reference head via the guide system.

*Disposition D: said guide system includes at least one element forming a spring. In particular, the guide system includes two parallel leaf springs connecting said support portion to said base, the plane of each leaf spring being orthogonal to the direction Y in the rest position of the device.

*Disposition E: the feeler head is mounted at the free end of the feeler rod and the reference head (first reference element) is mounted at the free end of the reference rod.

*Disposition F: the feeler rod and the reference rod are the same length.

*Disposition G: the device further comprises a calibration indicator (second reference element) mounted on and fastened to the base and situated in the vicinity of the reference head. This calibration indicator (second reference element) enables detection of the offset of the feeler head in direction Y (or in direction Z, or in direction X).

*Disposition H: a measurement system includes a mechanical feeler device of the above kind and an external device with an external sensor (such as for example an imaging device) adapted to determine the position of the reference head (first reference element).

*Disposition I: a measurement system of the above kind in which the external sensor is an optical device with an optical sensor the optical axis of which is disposed in an orthogonal manner to the plane (Y, Z).

*Disposition J: the measurement direction is orthogonal to said main axis (Z) of the sensor, for example in the horizontal direction Y.

The first embodiment 100, the second embodiment 200, the third embodiment 300 and the fourth embodiment 400 of the measurement system as described above include a mechanical sensor and are therefore examples of a contact profile determination technology. However, the measurement system according to the present invention may equally take the form of a contactless system.

A measurement system in accordance with the present invention of the above kind may equip a measurement bench or a station for checking parts during machining, and may even be an integrated module of a machine tool.

REFERENCE NUMBERS EMPLOYED IN THE FIGURES

X Transverse axis
Y Measurement axis
Z Main (vertical) axis
Y0 Distance separating feeler rod from first reference element rod
Z0 Distance separating feeler head and first reference element from support portion
dY1 Offset between base and support portion in measurement position
I0 Groove 114c width
L0 Groove 114c length
F1 Arrow (movement of sensor 110)
F2 Arrow (movement of sensor 110)
F3 Arrow (movement of support portion relative to base 112)
A Arrow (bearing force of first reference element 130 on part 50)
R Reference line (vertical line passing through second reference element 150)
M Measurement line of internal profile of internal face 54
C Line following internal profile to be measured
50 Part
51 Face to be measured (external face)
52 Housing (hole, bore, etc.)
54 Face to be measured (internal face)
100 Measurement system (first embodiment)
110 Sensor
110' Sensor
112 Base
112a First end
112b Second end
114 Support portion
114a First end of support portion
114b Second end of support portion
114c Groove
120 Probe
122 Feeler rod
123 Feeler head
130 First reference element
131 First reference element rod
140 Guide system
141 First leaf spring
142 Second leaf spring
143 Bar
143a First end of bar
143b Second end of bar
150 Second reference element
151 Second reference element rod
160 Imaging device
162 Field of view of imaging device
164 Light source
I Image after processing
200 Measurement system (second embodiment)
210 Sensor
212 Base
214 Support portion
220 Probe
222 Feeler rod
223 Feeler head
230 First reference element
231 First reference element rod
240 Guide system
241 Weight
250 Second reference element
251 Second reference element rod
P Rotation axis between 214 and 212
L1 Length of lever arm
300 Measurement system (third embodiment)
310 Sensor
312 Base (stirrup-shaped)
314 Support portion (L-shaped sliding mobile carriage)
320 Probe
322 Feeler rod
323 Feeler head
330 First reference element
331 First reference element rod
340 Guide system
344 Rail
345 Slide
346 First coil spring
347 Second coil spring
350 Second reference element
351 Second reference element rod
400 Measurement system (third embodiment)
410 Sensor
412 Base (stirrup-shaped)
414 Support portion (U-shaped sliding mobile carriage)
420 Probe
422 Feeler rod
423 Feeler head
430 First reference element
431 First reference element rod
440 Guide system 444 Rail
445 Slide
446 First coil spring
447 Second coil spring
450 Second reference element
451 Second reference element rod

What is claimed is:

1. System for measuring an external profile of a part or an internal profile of a hollow part, wherein said measurement system comprises
a sensor including a base, a support portion connected to the base by a guide system biased to provide a bearing force, a probe fastened to a feeler rod extending from the support system, a first reference element fastened to a rod extending from the support system such that movement of the first reference element corresponds with movement of the probe, the guide system allowing relative movement between the probe and the base at least in accordance with one degree of freedom defining a measurement direction,
said sensor being arranged so that during the movement of the sensor relative to the part in a different direction to the direction of measurement, said probe is able to follow the internal or external contour of the part along a path of the probe whereas the first reference element is outside the part and effects a path of the first reference element reproducing the path of the probe along the internal or external contour of the part, and
an imaging device adapted to capture images representing at least a portion of the outside of the part and the first reference element, whereby, by comparison between the images taken by the imaging device, the relative movement between the first reference element and the portion of the outside of the part in said measurement direction is detected, and a relative movement between the probe and the base is deduced therefrom, which corresponds to an offset in the measurement direction along the measured profile of the part.

2. Measurement system according to claim 1, wherein the internal contour or the external contour of the part forms a face of revolution around an axis.

3. Measurement system according to claim 2, wherein said guide system allows only one degree of freedom between the probe and the base.

4. Measurement system according to claim 2, wherein said measurement system further comprises a second reference element fastened to the base and disposed outside the part, said second reference element being placed so that the imaging device is able to see simultaneously said first reference element, said second reference element and said portion of the outside of the part.

5. Measurement system according to claim 1, wherein the probe includes a feeler head able to follow and to detect the internal or external contour of the part by contact.

6. Measurement system according to claim 1, wherein the probe includes a detection head adapted to follow and to detect the internal or external contour of the part without contact.

7. Measurement system according to claim 1, wherein the imaging device includes a video camera and a light source adapted to illuminate simultaneously said portion of the outside of the part and the first reference element.

8. Measurement system according to claim 7, wherein the video camera has a field of view enabling it to see said portion of the outside of the part and the first reference element.

9. Measurement system according to claim 2, wherein the guide system includes return means enabling return of the probe into a rest position relative to the base when the probe is no longer interacting with the internal or external contour of the part.

10. Measurement system according to claim 1, wherein the guide system includes between the probe and the base a sliding connection or a pivoting connection.

11. Measurement system according to claim 1, wherein:
the part is hollow and the internal contour of the part forms a face of revolution around an axis of revolution,
the probe includes a feeler head capable of detecting, by contact, the internal contour of the part and of following the internal contour of the part with a degree of freedom in a measurement direction (Y) perpendicular to said axis of revolution, said measurement direction (Y) separating the feeler head and the first reference element from one another,
the guide system includes a pivoting connection between the probe and the base about an axis (P) perpendicular to said axis of revolution and orthogonal to the measurement direction (Y).

12. Measurement system according to the preceding claim, wherein said measurement system further includes a second reference element fastened to the base and situated outside the part, the imaging device being capable of taking an image further comprising the second reference element, whereby the variation in the relative position between the first reference element and the second reference element allows measurement of the profile of the internal contour of the part.

13. Method of measuring an internal profile of a hollow part, comprising the following steps:
i) providing a sensor including a base, a support portion connected to the base by a guide system biased to provide a bearing force, a probe fastened to a feeler rod extending from the support system, a first reference element fastened to a rod extending from the support system such that movement of the first reference element corresponds with movement of the probe, the guide system allowing relative movement between the probe and the base at least in accordance with one degree of freedom defining a measurement direction, and providing an imaging device,
ii) providing a hollow part the internal profile of which is to be determined,
iii) placing the sensor so that the probe is inside the part and detects a point on the internal profile of the part while the first reference element is outside the part and in the field of view of the imaging device,
iv) triggering the imaging system and forming an image representing at least a portion of the outside of the part and said reference element,
v) moving the sensor relative to the part in a movement in a different direction to the direction of measurement and enabling the probe to remain inside the part and to follow the internal contour of the part, whereas the first reference element remains outside the part and effects the same movement as the probe,
vi) effecting steps iv) and v) for other points on the internal contour of the part.

14. Method of measuring an external profile of a part, comprising the following steps:
i) providing a sensor including a base, a support portion connected to the base by a guide system biased to provide a bearing force, a probe fastened to a feeler rod extending from the support system, a first reference element fastened to a rod extending from the support system such that movement of the first reference element corresponds with movement of the probe, the guide system allowing relative movement between the probe and the base at least in accordance with one degree of freedom defining a measurement direction, and providing an imaging device, ii) providing a part the external profile of which is to be determined, iii) placing the sensor so that the probe is outside the part and detects a point on the external profile of the part whereas the first reference element is also outside the part and in the field of view of the imaging device, iv) triggering the imaging system and forming an image representing at least a portion of the outside of the part and said reference element, v) moving the sensor relative to the part in a movement in a different direction to the direction of measurement and enabling the probe to follow the external contour of the part while the first reference element remains outside the part and effects the same movement as the probe, vi) effecting steps iv) and v) for other points on the external contour of the part.

15. Method of measuring a profile of a part, comprising the following steps:

i) providing a sensor including a base, a support portion connected to the base by a guide system biased to provide a bearing force a probe fastened to a feeler rod extending from the support system, a first reference element fastened to a rod extending from the support system such that movement of the first reference element corresponds with movement of the probe, the guide system allowing relative movement between them the probe and the base at least in accordance with one degree of freedom defining a measurement direction, and providing an imaging device, ii) providing a part the profile of which is to be determined, iii) placing the sensor so that the probe detects a point on the contour of the part while the first reference element is outside the part and in the field of view of the imaging device, iv) triggering the imaging system and forming an image representing at least a portion of the outside of the part and said reference element, v) moving the sensor relative to the part in a movement in a different direction to the direction of measurement and enabling the probe to follow the contour of the part while the first reference element remains outside the part and effects the same movement as the probe, vi) effecting steps iv) and v) for other points on the contour of the part.

16. Measuring method according to claim 13, wherein the following steps are further effected:

a) for each image formed by said imaging device calculating the relative position between the first reference element and the portion of the outside of the part, and b) reconstituting the measured profile of the part on the basis of said relative positions of the first reference element successively calculated.

17. Measuring method according to claim 13, wherein the following steps are further effected:

the images taken by the imaging device are compared in order to detect the relative movement between the first reference element and the portion of the outside of the part in said measurement direction, and a relative movement between the probe and the base is deduced therefrom, which corresponds to an offset in the measurement direction along the measured profile of the part.

18. Measuring method according to claim 14, wherein the part is hollow and the internal contour of the part forms a face of revolution around an axis of revolution, the probe includes a feeler head capable of detecting, by contact, the internal contour of the part and of following the internal contour of the part with a degree of freedom in a measurement direction (Y) perpendicular to said axis of revolution, said measurement direction (Y) separating the feeler head and the first reference element from one another, the guide system includes a pivoting connection between the probe and the base about an axis (P) perpendicular to said axis of revolution and orthogonal to the measurement direction (Y).

19. Measuring method according to claim 18, wherein the sensor further includes a second reference element fastened to the base and situated outside the part, the imaging device being capable of taking an image further comprising the second reference element, whereby the variation in the relative position between the first reference element and the second reference element allows measurement of the profile of the internal contour of the part.

20. Measuring method according to claim 14, wherein the following steps are further effected:

a) for each image formed by said imaging device calculating the relative position between the first reference element and the portion of the outside of the part, and b) reconstituting the measured profile of the part on the basis of said relative positions of the first reference element successively calculated.

21. Measuring method according to claim 14, wherein the following steps are further effected:

the images taken by the imaging device are compared in order to detect the relative movement between the first reference element and the portion of the outside of the part in said measurement direction, and a relative movement between the probe and the base is deduced therefrom, which corresponds to an offset in the measurement direction along the measured profile of the part.

22. Measuring method according to claim 15, wherein the following steps are further effected:

a) for each image formed by said imaging device calculating the relative position between the first reference element and the portion of the outside of the part, and b) reconstituting the measured profile of the part on the basis of said relative positions of the first reference element successively calculated.

23. Measuring method according to claim 15, wherein the following steps are further effected:

the images taken by the imaging device are compared in order to detect the relative movement between the first reference element and the portion of the outside of the part in said measurement direction, and a relative movement between the probe and the base is deduced therefrom, which corresponds to an offset in the measurement direction along the measured profile of the part.

* * * * *